(12) United States Patent
Tartan et al.

(10) Patent No.: US 12,348,652 B2
(45) Date of Patent: Jul. 1, 2025

(54) KEY DERIVATION METHOD

(71) Applicant: nChain Licensing AG, Zug (CH)

(72) Inventors: Chloe Tartan, London (GB); Michaella Pettit, London (GB); Alessio Pagani, London (GB); Wei Zhang, London (GB)

(73) Assignee: nChain Licensing AG, Zug (CH)

( * ) Notice: Subject to any disclaimer, the term of this patent is extended or adjusted under 35 U.S.C. 154(b) by 226 days.

(21) Appl. No.: 18/034,340

(22) PCT Filed: Oct. 15, 2021

(86) PCT No.: PCT/EP2021/078601
§ 371 (c)(1),
(2) Date: Apr. 27, 2023

(87) PCT Pub. No.: WO2022/100958
PCT Pub. Date: May 19, 2022

(65) Prior Publication Data
US 2023/0396450 A1 Dec. 7, 2023

(30) Foreign Application Priority Data
Nov. 13, 2020 (GB) ..................... 2017904

(51) Int. Cl.
*H04L 29/06* (2006.01)
*H04L 9/00* (2022.01)
(Continued)

(52) U.S. Cl.
CPC .......... *H04L 9/3268* (2013.01); *H04L 9/0866* (2013.01); *H04L 9/3242* (2013.01); *H04L 9/3265* (2013.01); *H04L 9/50* (2022.05)

(58) Field of Classification Search
CPC ... H04L 9/3268; H04L 9/0866; H04L 9/3242; H04L 9/3265; H04L 9/50; H04L 9/3236; H04L 9/3263; H04L 9/0861; H04L 9/0643
See application file for complete search history.

(56) References Cited

U.S. PATENT DOCUMENTS 9,208,335 B2 * 12/2015 Wu .................. H04L 9/3234
11,368,391 B2 * 6/2022 Pitio .................. G06F 21/6227
(Continued)

FOREIGN PATENT DOCUMENTS

| EP | 2533457 B1 | 11/2019 |
|---|---|---|
| KR | 20200064017 A | 6/2020 |

OTHER PUBLICATIONS

Bitcoin, "Wallets," Hardened Keys, retrieved from the Internet: URL: https://bitcoin.org/en/wallets-guide#hardened-keys, accessed on Apr. 14, 2020, 9 pages.
(Continued)

*Primary Examiner* — Mahfuzur Rahman
(74) *Attorney, Agent, or Firm* — Messner Reeves LLP

(57) ABSTRACT

A computer-implemented method of deriving keys of a hierarchical key structure, wherein the method is performed by a first party and comprises: generating a target index of a target child key, wherein the target index is generated based on a first result of inputting at least a target message to a first hash function; and deriving the target child key of a level in a hierarchy of a key structure based on a) a parent key of a preceding level in the hierarchy, and b) a second result of inputting at least i) the parent key, and ii) the target index, to a second hash function.

20 Claims, 10 Drawing Sheets

(51) Int. Cl.
*H04L 9/08* (2006.01)
*H04L 9/32* (2006.01)

(56) References Cited

U.S. PATENT DOCUMENTS

| | | | |
|---|---|---|---|
| 11,477,135 B2* | 10/2022 | Pitio | G06Q 40/04 |
| 2007/0006150 A9* | 1/2007 | Walmsley | G06F 21/554 |
| | | | 717/174 |
| 2019/0222510 A1* | 7/2019 | Pitio | G06Q 20/027 |
| 2019/0305943 A1 | 10/2019 | Hoersten et al. | |
| 2022/0327525 A1* | 10/2022 | Tsitrin | H04L 9/0897 |
| 2023/0396450 A1* | 12/2023 | Tartan | H04L 9/3268 |

OTHER PUBLICATIONS

Bitcoin Wiki, "Vanitygen," Expected keysearch rate, retrieved from the Internet: URL: https://en.bitcoin.it/wiki/Vanitygen, accessed on Nov. 16, 2020, 5 pages.
Combined Search and Examination Report under Sections 17 and 18(3) for Application No. GB2017904.0, mailed on Aug. 11, 2021, 9 pages.
Directives, "Directive (EU) 2018/843 of the European Parliament and of the Council," Official Journal of the European Union, May 30, 2018, retrieved from the Internet: URL: https://eur-lex.europa.eu/legal-content/EN/TXT/PDF/?uri=CELEX:32018L0843, accessed on Aug. 18, 2020, 32 pages.
International Search report and Written Opinion issued in International Application No. PCT/EP2021/078601, mailed on Jan. 7, 2022, 12 pages.
Palatinus M., et al., "Mnemonic Code for Generating Deterministic Keys," BIP 0039, Sep. 10, 2013, retrieved from the Internet: https://github.com/bitcoin/bips/blob/master/bip-0039.mediawiki, accessed on Nov. 16, 2020, 6 pages.
Palatinus M., et al., "Multi-Account Hierarchy for Deterministic Wallets," BIP-0044, Apr. 24, 2014, GITHUB, retrieved from the Internet: https://github.com/bitcoin/bips/blob/master/bip-0044.mediawiki, accessed on Nov. 16, 2020, pp. 1-5.
Palatinus M., et al., "Purpose Field for Deterministic Wallets," BIP: 43, GITHUB, Apr. 24, 2014, retrieved from the Internet: URL: https://github.com/bitcoin/bips/blob/master/bip-0043.mediawiki, accessed on Nov. 16, 2020, 3 pages.
Rusnak P., et al., "SLIP-0044 : Registered coin types for BIP-0044," GITHUB, satoshilabs/slips, Jul. 9, 2014, retrieved from the Internet: URL: https://github.com/satoshilabs/slips/blob/master/slip-0044.md, accessed on Nov. 16, 2020, 48 pages.
Tankovska H., "Apple iPhone Sales by Year Worldwide 2007-2018," STATISTA, Sep. 21, 2020, retrieved from the Internet: URL: https://www.statista.com/statistics/276306/global-apple-iphone-sales-since-fiscal-year-2007/, accessed on Nov. 16, 2020, 2 pages.
Vaughan O., "Benford's Wallet," nChain, Oct. 22, 2019, retrieved from the Internet: URL: https://nchain.com/benfords-wallet/, accessed on Nov. 16, 2020, 7 pages.
Wikipedia, "Birthday Problem," retrieved from the Internet: URL: https://en.wikipedia.org/wiki/Birthday_problem, accessed on Nov. 16, 2020, 11 pages.
Wuille P., "Hierarchical Deterministic Wallets," BIP-0032, Feb. 11, 2012, GITHUB, retrieved from the Internet: https://github.com/bitcoin/bips/blob/master/bip-0032.mediawiki, accessed on Nov. 16, 2020, 15 pages.

* cited by examiner

KEY DERIVATION METHOD

CROSS REFERENCE TO RELATED APPLICATIONS

This application is the U.S. National Stage of International Application No. PCT/EP2021/078601 filed on Oct. 15, 2021, which claims the benefit of United Kingdom Patent Application No. 2017904.0, filed on Nov. 13, 2020, the contents of which are incorporated herein by reference in their entireties.

TECHNICAL FIELD

The present disclosure relates to a method of deriving child keys (e.g. private keys) of a hierarchical key structure from external state. For instance, the keys may be used for signing blockchain transactions and/or generating blockchain addresses.

BACKGROUND

In the context of blockchain technology, a "wallet application" or just a "wallet" typically refers to an application that, amongst other things, is configured to store a collection of keys (i.e. public and/or private keys) owned by a particular party.

To maintain privacy on a public blockchain, it is recommended to avoid the reuse of public keys, which are derived from private keys. This can lead to wallets being a collection of randomly generated private keys that need to be securely stored, and frequently backed up to ensure that the keys are not lost or stolen. By avoiding key reuse, this type of wallet can quickly generate a 'bag of keys' problem.

Hierarchical deterministic (HD) wallets were invented to improve the efficiency of storage and regeneration of keys, resolving this bag of keys problem. HD wallets bring additional benefits in terms of privacy and having the ability to share branches of the wallet with different systems or subsystems. This type of wallet can generate many keys from a single random seed and is the most common type of blockchain wallet used today.

Wallet implementations generally follow bitcoin improvement proposal 32 (BIP32) which describes how to derive multiple child keys from a parent key. Some implementations also use BIP44 which defines purposes of branches within the wallet. In an HD wallet implementation, a master private key is derived from a random seed. This master private key is used to derive generations of keys (children, grandchildren and so on).

FIG. 4 illustrates the resultant tree-like structure that emerges in an HD wallet. The data structure is a powerful mechanism for managing the security of wallets and their ability to recover funds during restoration. Depending on the implementation, a user (i.e. a wallet owner) or an observer can create a sequence of public keys without the corresponding private keys. Since fewer secrets need to be stored, there is a lower risk of exposure. In addition, if keys are lost, they can be recovered from the seed key.

The equation for deriving a child key from a parent key depends on whether the public or private key of the parent will be used as an input to the derivation function; use of the parent private key results in a 'hardened' child key, and use of the parent public key results in a 'normal' (i.e. non-hardened, in keeping with BIP32 terminology) child key.

Child keys are generated using a child key derivation (CKD) function. The particular form of CKD function depends on the particular wallet implementation, but in general a child key is based on a parent key and an index. The index allows a parent key to give rise to multiple child keys. I.e. a parent key may have multiple child keys. Normally the index takes a value of a sequence, with a first child key of the parent key taking a first value in the sequence (e.g. zero), a second child key of the parent key taking the next value in the sequence (e.g. one), and so on.

Note that at the time of writing, it is not possible to derive a hardened child public key if one only has knowledge of the parent public key and chain code. Requesting payment to normal child keys means that a receiver can give away only the parent public key (and chain code), and the sender can send payments by deriving multiple normal (i.e. non-hardened) child keys. This way, a receiver of funds does not need to give each address to a sender explicitly.

This ensures that multiple payments can be sent while minimising communication between the same two parties, and enhancing privacy when transacting on a public blockchain.

The equation for a normal child private key $sk_i$ is:

$$sk_i = sk_{par} + \text{HMAC512}_L(c_{par}, pk_{par} \| \text{index}), \quad (1)$$

and for a hardened child private key $sk'_i$ is $$sk_i = sk_{par} + \text{HMAC512}_L(c_{par}, sk_{par} \| \text{index}'), \quad (2)$$

where
- $sk_{par}$ is the private key of the parent,
- $pk_{par}$ is the public key of the parent,
- $\text{HMAC512}_L$ (■) is the left 32 bytes of the result of the HMAC function that uses the SHA512 hash function,
- $c_{par}$ is the chain code of the parent key and is defined as $c_{par} = \text{HMAC-SHA512}_R$ ($c_{grandparent}$, $P_{grandparent} \| \text{index}_{par}$),
- index is the counter on the child keys that will increase each time a new child key is calculated, starting at 0. By convention, this is $0 \leq \text{index} < 2^{31}$ for normal keys and $2^{31} \leq \text{index}' < 2^{32}$ for hardened keys.

SUMMARY

A protocol known as "Benford's wallet" (see https://nchain.com/2019/10/22/benfords-wallet/ and UK patent application GB1913667.0) can be used to increase privacy. The concept behind this is to split an output of a transaction into multiple outputs, where the split of the values will follow Benford's law under a large enough data set of these outputs. The aim of the wallet is that it obfuscates the full value of a payment, such that regular payments of the same amount are hidden. However, in order to be able to prove to an auditor the full value of the payment, Benford's wallet describes external data, such as an invoice, being included in the calculation of the public keys that receive payment in this way. This means that the data relating to the invoices must be stored, and the bag of keys problem is reintroduced.

It would therefore be desirable to incorporate external data in the derivation of child keys without reintroducing the bag of keys problem.

According to one aspect disclosed herein, there is provided a computer-implemented method of deriving keys of a hierarchical key structure, wherein the key structure comprising a hierarchy of levels, the hierarchy of levels comprising a master level and one or more child levels, wherein the master level comprises a master key, and wherein each child level comprises one or more child keys, each respective child key of a given level being linked to one key of a preceding level, wherein that one key of the preceding level is a respective parent key of the respective child key, and wherein the method is performed by a first party and comprises: generating a target index of a target child key, wherein the target index is generated based on a first result of inputting at least a target message to a first hash function; and deriving the target child key of a level in the hierarchy based on a) a parent key of a preceding level in the hierarchy, and b) a second result of inputting at least i) the parent key, and ii) the target index, to a second hash function.

The inventors of the present application have realised that it is advantageous to link a child key to external data. External data is generally referred to below as a "message", but this message need not be a message in the sense of a communication between one or more parties (e.g. an email), although that is not excluded. Generally a message may be any type of user or machine generated data item. The message is used to generate the index which in turn is used to derive the child key. That is, embodiments of the present invention change the nature of the index—instead of taking the next unused value of a sequence, the index is now based on the hash of a message.

Now, external data can be included in the derivation of child keys such that one can provide evidence to a third party (e.g. an auditor) that the child keys are linked to some external data, such as an invoice. Unlike Benford's wallet, wallet recovery only requires the seed of the HD wallet. The method also facilitates hassle-free wallet migration without any extra work carried out by the user or different wallet providers. Whilst not limited to any particular wallet protocol, the solution does not change the HD wallet protocol specified in BIP32 but instead gives additional meaning to the indexes that are used to derive the keys. By using the seed and message(s) to derive the wallet data file deterministically, several advantages are obtained in terms of wallet migration and recovery that are currently restrictive to wallet users. These are discussed in detail below.

Note that whilst the example use cases provided herein are primarily blockchain related, the described embodiments apply generally to the use of keys in any relevant setting. For instance, the child keys may be used as private keys to generate digital signatures which have application in many areas of technology. As another example, the child keys may be used as encryption keys in any setting.

BRIEF DESCRIPTION OF THE DRAWINGS

To assist understanding of embodiments of the present disclosure and to show how such embodiments may be put into effect, reference is made, by way of example only, to the accompanying drawings in which.

DETAILED DESCRIPTION OF EMBODIMENTS

Example System Overview

Figure 1:
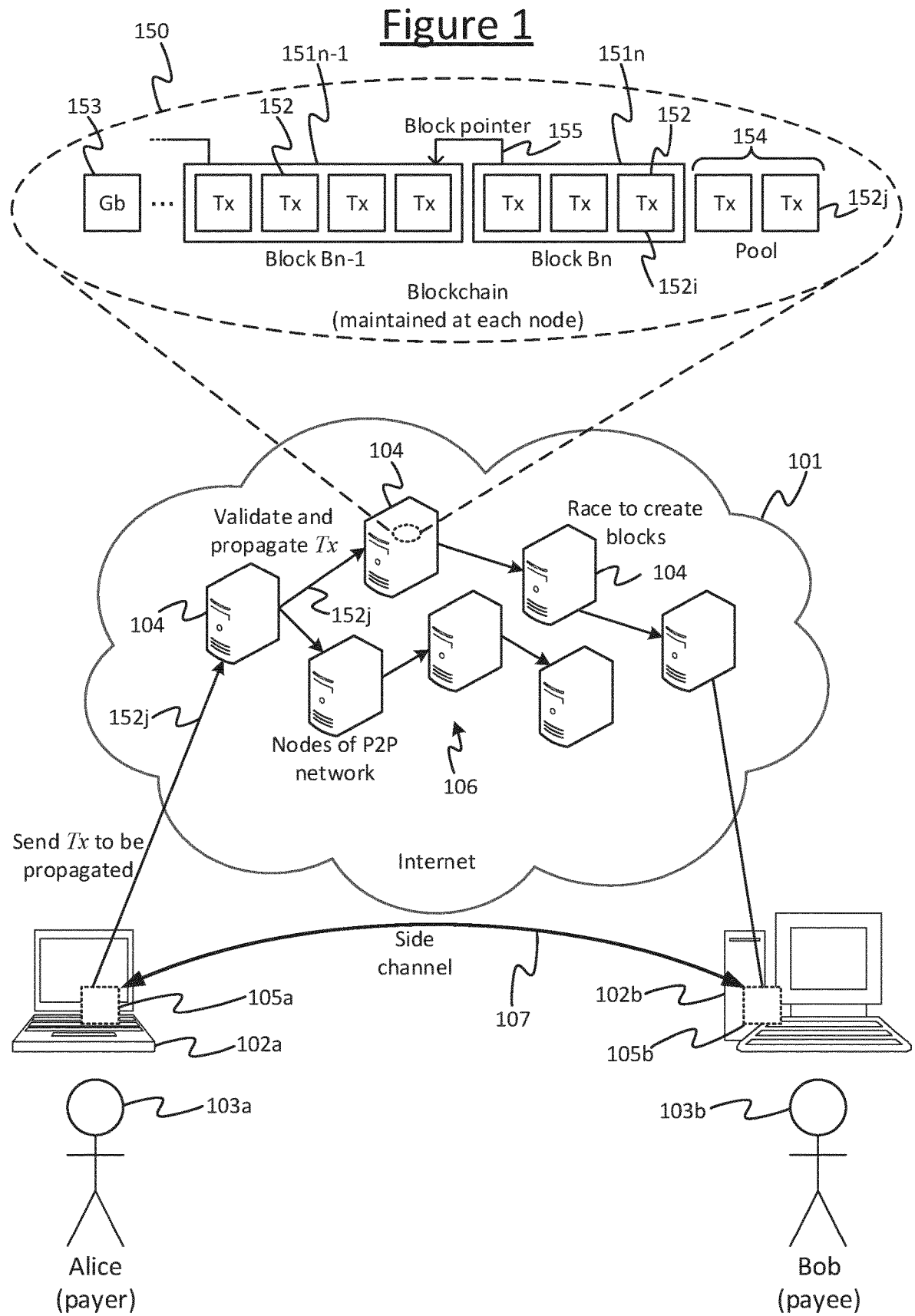
FIG. 1 is a schematic block diagram of a system for implementing a blockchain.

FIG. 1 shows an example system 100 for implementing a blockchain 150. The system 100 may comprise a packet-switched network 101, typically a wide-area internetwork such as the Internet. The packet-switched network 101 comprises a plurality of blockchain nodes 104 that may be arranged to form a peer-to-peer (P2P) network 106 within the packet-switched network 101. Whilst not illustrated, the blockchain nodes 104 may be arranged as a near-complete graph. Each blockchain node 104 is therefore highly connected to other blockchain nodes 104.

Each blockchain node 104 comprises computer equipment of a peer, with different ones of the nodes 104 belonging to different peers. Each blockchain node 104 comprises processing apparatus comprising one or more processors, e.g. one or more central processing units (CPUs), accelerator processors, application specific processors and/or field programmable gate arrays (FPGAs), and other equipment such as application specific integrated circuits (ASICs). Each node also comprises memory, i.e. computer-readable storage in the form of a non-transitory computer-readable medium or media. The memory may comprise one or more memory units employing one or more memory media, e.g. a magnetic medium such as a hard disk; an electronic medium such as a solid-state drive (SSD), flash memory or EEPROM; and/or an optical medium such as an optical disk drive.

The blockchain 150 comprises a chain of blocks of data 151, wherein a respective copy of the blockchain 150 is maintained at each of a plurality of blockchain nodes 104 in the distributed or blockchain network 106. As mentioned above, maintaining a copy of the blockchain 150 does not necessarily mean storing the blockchain 150 in full. Instead, the blockchain 150 may be pruned of data so long as each blockchain node 150 stores the block header (discussed below) of each block 151. Each block 151 in the chain comprises one or more transactions 152, wherein a transaction in this context refers to a kind of data structure. The nature of the data structure will depend on the type of transaction protocol used as part of a transaction model or scheme. A given blockchain will use one particular transaction protocol throughout. In one common type of transaction protocol, the data structure of each transaction 152 comprises at least one input and at least one output. Each output specifies an amount representing a quantity of a digital asset as property, an example of which is a user 103 to whom the output is cryptographically locked (requiring a signature or other solution of that user in order to be unlocked and thereby redeemed or spent). Each input points back to the output of a preceding transaction 152, thereby linking the transactions.

Each block 151 also comprises a block pointer 155 pointing back to the previously created block 151 in the chain so as to define a sequential order to the blocks 151. Each transaction 152 (other than a coinbase transaction) comprises a pointer back to a previous transaction so as to define an order to sequences of transactions (N.B. sequences of transactions 152 are allowed to branch). The chain of blocks 151 goes all the way back to a genesis block (Gb) 153 which was the first block in the chain. One or more original transactions 152 early on in the chain 150 pointed to the genesis block 153 rather than a preceding transaction.

Each of the blockchain nodes 104 is configured to forward transactions 152 to other blockchain nodes 104, and thereby cause transactions 152 to be propagated throughout the network 106. Each blockchain node 104 is configured to create blocks 151 and to store a respective copy of the same blockchain 150 in their respective memory. Each blockchain node 104 also maintains an ordered set (or "pool") 154 of transactions 152 waiting to be incorporated into blocks 151. The ordered pool 154 is often referred to as a "mempool". This term herein is not intended to limit to any particular blockchain, protocol or model. It refers to the ordered set of transactions which a node 104 has accepted as valid and for which the node 104 is obliged not to accept any other transactions attempting to spend the same output.

In a given present transaction 152j, the (or each) input comprises a pointer referencing the output of a preceding transaction 152i in the sequence of transactions, specifying that this output is to be redeemed or "spent" in the present transaction 152j. In general, the preceding transaction could be any transaction in the ordered set 154 or any block 151. The preceding transaction 152i need not necessarily exist at the time the present transaction 152j is created or even sent to the network 106, though the preceding transaction 152i will need to exist and be validated in order for the present transaction to be valid. Hence "preceding" herein refers to a predecessor in a logical sequence linked by pointers, not necessarily the time of creation or sending in a temporal sequence, and hence it does not necessarily exclude that the transactions 152i, 152j be created or sent out-of-order (see discussion below on orphan transactions). The preceding transaction 152i could equally be called the antecedent or predecessor transaction.

The input of the present transaction 152j also comprises the input authorisation, for example the signature of the user 103a to whom the output of the preceding transaction 152i is locked. In turn, the output of the present transaction 152j can be cryptographically locked to a new user or entity 103b. The present transaction 152j can thus transfer the amount defined in the input of the preceding transaction 152i to the new user or entity 103b as defined in the output of the present transaction 152j. In some cases a transaction 152 may have multiple outputs to split the input amount between multiple users or entities (one of whom could be the original user or entity 103a in order to give change). In some cases a transaction can also have multiple inputs to gather together the amounts from multiple outputs of one or more preceding transactions, and redistribute to one or more outputs of the current transaction.

According to an output-based transaction protocol such as bitcoin, when a party 103, such as an individual user or an organization, wishes to enact a new transaction 152j (either manually or by an automated process employed by the party), then the enacting party sends the new transaction from its computer terminal 102 to a recipient. The enacting party or the recipient will eventually send this transaction to one or more of the blockchain nodes 104 of the network 106 (which nowadays are typically servers or data centres, but could in principle be other user terminals). It is also not excluded that the party 103 enacting the new transaction 152j could send the transaction directly to one or more of the blockchain nodes 104 and, in some examples, not to the recipient. A blockchain node 104 that receives a transaction checks whether the transaction is valid according to a blockchain node protocol which is applied at each of the blockchain nodes 104. The blockchain node protocol typically requires the blockchain node 104 to check that a cryptographic signature in the new transaction 152j matches the expected signature, which depends on the previous transaction 152i in an ordered sequence of transactions 152. In such an output-based transaction protocol, this may comprise checking that the cryptographic signature or other authorisation of the party 103 included in the input of the new transaction 152j matches a condition defined in the output of the preceding transaction 152i which the new transaction assigns, wherein this condition typically comprises at least checking that the cryptographic signature or other authorisation in the input of the new transaction 152j unlocks the output of the previous transaction 152i to which the input of the new transaction is linked to. The condition may be at least partially defined by a script included in the output of the preceding transaction 152i. Alternatively it could simply be fixed by the blockchain node protocol alone, or it could be due to a combination of these. Either way, if the new transaction 152j is valid, the blockchain node 104 forwards it to one or more other blockchain nodes 104 in the blockchain network 106. These other blockchain nodes 104 apply the same test according to the same blockchain node protocol, and so forward the new transaction 152j on to one or more further nodes 104, and so forth. In this way the new transaction is propagated throughout the network of blockchain nodes 104.

In an output-based model, the definition of whether a given output (e.g. UTXO) is assigned (e.g. spent) is whether it has yet been validly redeemed by the input of another, onward transaction 152j according to the blockchain node protocol. Another condition for a transaction to be valid is that the output of the preceding transaction 152i which it attempts to redeem has not already been redeemed by another transaction. Again if not valid, the transaction 152j will not be propagated (unless flagged as invalid and propagated for alerting) or recorded in the blockchain 150. This guards against double-spending whereby the transactor tries to assign the output of the same transaction more than once. An account-based model on the other hand guards against double-spending by maintaining an account balance. Because again there is a defined order of transactions, the account balance has a single defined state at any one time.

In addition to validating transactions, blockchain nodes 104 also race to be the first to create blocks of transactions in a process commonly referred to as mining, which is supported by "proof-of-work". At a blockchain node 104, new transactions are added to an ordered pool 154 of valid transactions that have not yet appeared in a block 151 recorded on the blockchain 150. The blockchain nodes then race to assemble a new valid block 151 of transactions 152 from the ordered set of transactions 154 by attempting to solve a cryptographic puzzle. Typically this comprises searching for a "nonce" value such that when the nonce is concatenated with a representation of the ordered pool of pending transactions 154 and hashed, then the output of the hash meets a predetermined condition. E.g. the predetermined condition may be that the output of the hash has a certain predefined number of leading zeros. Note that this is just one particular type of proof-of-work puzzle, and other types are not excluded. A property of a hash function is that it has an unpredictable output with respect to its input. Therefore this search can only be performed by brute force, thus consuming a substantive amount of processing resource at each blockchain node 104 that is trying to solve the puzzle.

The first blockchain node 104 to solve the puzzle announces this to the network 106, providing the solution as proof which can then be easily checked by the other blockchain nodes 104 in the network (once given the solution to a hash it is straightforward to check that it causes the output of the hash to meet the condition). The first blockchain node 104 propagates a block to a threshold consensus of other nodes that accept the block and thus enforce the protocol rules. The ordered set of transactions 154 then becomes recorded as a new block 151 in the blockchain 150 by each of the blockchain nodes 104. A block pointer 155 is also assigned to the new block 151n pointing back to the previously created block 151n−1 in the chain. The significant amount of effort, for example in the form of hash, required to create a proof-of-work solution signals the intent of the first node 104 to follow the rules of the blockchain protocol. Such rules include not accepting a transaction as valid if it assigns the same output as a previously validated transaction, otherwise known as double-spending. Once created, the block 151 cannot be modified since it is recognized and maintained at each of the blockchain nodes 104 in the blockchain network 106. The block pointer 155 also imposes a sequential order to the blocks 151. Since the transactions 152 are recorded in the ordered blocks at each blockchain node 104 in a network 106, this therefore provides an immutable public ledger of the transactions.

Note that different blockchain nodes 104 racing to solve the puzzle at any given time may be doing so based on different snapshots of the pool of yet-to-be published transactions 154 at any given time, depending on when they started searching for a solution or the order in which the transactions were received. Whoever solves their respective puzzle first defines which transactions 152 are included in the next new block 151n and in which order, and the current pool 154 of unpublished transactions is updated. The blockchain nodes 104 then continue to race to create a block from the newly-defined ordered pool of unpublished transactions 154, and so forth. A protocol also exists for resolving any "fork" that may arise, which is where two blockchain nodes 104 solve their puzzle within a very short time of one another such that a conflicting view of the blockchain gets propagated between nodes 104. In short, whichever prong of the fork grows the longest becomes the definitive blockchain 150. Note this should not affect the users or agents of the network as the same transactions will appear in both forks.

According to the bitcoin blockchain (and most other blockchains) a node that successfully constructs a new block 104 is granted the ability to newly assign an additional, accepted amount of the digital asset in a new special kind of transaction which distributes an additional defined quantity of the digital asset (as opposed to an inter-agent, or inter-user transaction which transfers an amount of the digital asset from one agent or user to another). This special type of transaction is usually referred to as a "coinbase transaction", but may also be termed an "initiation transaction" or "generation transaction". It typically forms the first transaction of the new block 151n. The proof-of-work signals the intent of the node that constructs the new block to follow the protocol rules allowing this special transaction to be redeemed later. The blockchain protocol rules may require a maturity period, for example 100 blocks, before this special transaction may be redeemed. Often a regular (non-generation) transaction 152 will also specify an additional transaction fee in one of its outputs, to further reward the blockchain node 104 that created the block 151n in which that transaction was published. This fee is normally referred to as the "transaction fee", and is discussed blow.

Due to the resources involved in transaction validation and publication, typically at least each of the blockchain nodes 104 takes the form of a server comprising one or more physical server units, or even whole a data centre. However in principle any given blockchain node 104 could take the form of a user terminal or a group of user terminals networked together.

The memory of each blockchain node 104 stores software configured to run on the processing apparatus of the blockchain node 104 in order to perform its respective role or roles and handle transactions 152 in accordance with the blockchain node protocol. It will be understood that any action attributed herein to a blockchain node 104 may be performed by the software run on the processing apparatus of the respective computer equipment. The node software may be implemented in one or more applications at the application layer, or a lower layer such as the operating system layer or a protocol layer, or any combination of these.

Also connected to the network 101 is the computer equipment 102 of each of a plurality of parties 103 in the role of consuming users. These users may interact with the blockchain network 106 but do not participate in validating transactions or constructing blocks. Some of these users or agents 103 may act as senders and recipients in transactions. Other users may interact with the blockchain 150 without necessarily acting as senders or recipients. For instance, some parties may act as storage entities that store a copy of the blockchain 150 (e.g. having obtained a copy of the blockchain from a blockchain node 104).

Some or all of the parties 103 may be connected as part of a different network, e.g. a network overlaid on top of the blockchain network 106. Users of the blockchain network (often referred to as "clients") may be said to be part of a system that includes the blockchain network 106; however, these users are not blockchain nodes 104 as they do not perform the roles required of the blockchain nodes. Instead, each party 103 may interact with the blockchain network 106 and thereby utilize the blockchain 150 by connecting to (i.e. communicating with) a blockchain node 106. Two parties 103 and their respective equipment 102 are shown for illustrative purposes: a first party 103a and his/her respective computer equipment 102a, and a second party 103b and his/her respective computer equipment 102b. It will be understood that many more such parties 103 and their respective computer equipment 102 may be present and participating in the system 100, but for convenience they are not illustrated. Each party 103 may be an individual or an organization. Purely by way of illustration the first party 103a is referred to herein as Alice and the second party 103b is referred to as Bob, but it will be appreciated that this is not limiting and any reference herein to Alice or Bob may be replaced with "first party" and "second "party" respectively.

The computer equipment 102 of each party 103 comprises respective processing apparatus comprising one or more processors, e.g. one or more CPUs, GPUs, other accelerator processors, application specific processors, and/or FPGAs. The computer equipment 102 of each party 103 further comprises memory, i.e. computer-readable storage in the form of a non-transitory computer-readable medium or media. This memory may comprise one or more memory units employing one or more memory media, e.g. a magnetic medium such as hard disk; an electronic medium such as an SSD, flash memory or EEPROM; and/or an optical medium such as an optical disc drive. The memory on the computer equipment 102 of each party 103 stores software comprising a respective instance of at least one client application 105 arranged to run on the processing apparatus. It will be understood that any action attributed herein to a given party 103 may be performed using the software run on the processing apparatus of the respective computer equipment 102. The computer equipment 102 of each party 103 comprises at least one user terminal, e.g. a desktop or laptop computer, a tablet, a smartphone, or a wearable device such as a smartwatch. The computer equipment 102 of a given party 103 may also comprise one or more other networked resources, such as cloud computing resources accessed via the user terminal.

The client application 105 may be initially provided to the computer equipment 102 of any given party 103 on suitable computer-readable storage medium or media, e.g. downloaded from a server, or provided on a removable storage device such as a removable SSD, flash memory key, removable EEPROM, removable magnetic disk drive, magnetic floppy disk or tape, optical disk such as a CD or DVD ROM, or a removable optical drive, etc.

The client application 105 comprises at least a "wallet" function. This has two main functionalities. One of these is to enable the respective party 103 to create, authorise (for example sign) and send transactions 152 to one or more bitcoin nodes 104 to then be propagated throughout the network of blockchain nodes 104 and thereby included in the blockchain 150. The other is to report back to the respective party the amount of the digital asset that he or she currently owns. In an output-based system, this second functionality comprises collating the amounts defined in the outputs of the various 152 transactions scattered throughout the blockchain 150 that belong to the party in question.

Note: whilst the various client functionality may be described as being integrated into a given client application 105, this is not necessarily limiting and instead any client functionality described herein may instead be implemented in a suite of two or more distinct applications, e.g. interfacing via an API, or one being a plug-in to the other. More generally the client functionality could be implemented at the application layer or a lower layer such as the operating system, or any combination of these. The following will be described in terms of a client application 105 but it will be appreciated that this is not limiting.

The instance of the client application or software 105 on each computer equipment 102 is operatively coupled to at least one of the blockchain nodes 104 of the network 106. This enables the wallet function of the client 105 to send transactions 152 to the network 106. The client 105 is also able to contact blockchain nodes 104 in order to query the blockchain 150 for any transactions of which the respective party 103 is the recipient (or indeed inspect other parties' transactions in the blockchain 150, since in embodiments the blockchain 150 is a public facility which provides trust in transactions in part through its public visibility). The wallet function on each computer equipment 102 is configured to formulate and send transactions 152 according to a transaction protocol. As set out above, each blockchain node 104 runs software configured to validate transactions 152 according to the blockchain node protocol, and to forward transactions 152 in order to propagate them throughout the blockchain network 106. The transaction protocol and the node protocol correspond to one another, and a given transaction protocol goes with a given node protocol, together implementing a given transaction model. The same transaction protocol is used for all transactions 152 in the blockchain 150. The same node protocol is used by all the nodes 104 in the network 106.

When a given party 103, say Alice, wishes to send a new transaction 152j to be included in the blockchain 150, then she formulates the new transaction in accordance with the relevant transaction protocol (using the wallet function in her client application 105). She then sends the transaction 152 from the client application 105 to one or more blockchain nodes 104 to which she is connected. E.g. this could be the blockchain node 104 that is best connected to Alice's computer 102. When any given blockchain node 104 receives a new transaction 152j, it handles it in accordance with the blockchain node protocol and its respective role. This comprises first checking whether the newly received transaction 152j meets a certain condition for being "valid", examples of which will be discussed in more detail shortly. In some transaction protocols, the condition for validation may be configurable on a per-transaction basis by scripts included in the transactions 152.

Alternatively the condition could simply be a built-in feature of the node protocol, or be defined by a combination of the script and the node protocol.

On condition that the newly received transaction 152j passes the test for being deemed valid (i.e. on condition that it is "validated"), any blockchain node 104 that receives the transaction 152j will add the new validated transaction 152 to the ordered set of transactions 154 maintained at that blockchain node 104. Further, any blockchain node 104 that receives the transaction 152j will propagate the validated transaction 152 onward to one or more other blockchain nodes 104 in the network 106. Since each blockchain node 104 applies the same protocol, then assuming the transaction 152j is valid, this means it will soon be propagated throughout the whole network 106.

Once admitted to the ordered pool of pending transactions 154 maintained at a given blockchain node 104, that blockchain node 104 will start competing to solve the proof-of-work puzzle on the latest version of their respective pool of 154 including the new transaction 152 (recall that other blockchain nodes 104 may be trying to solve the puzzle based on a different pool of transactions 154, but whoever gets there first will define the set of transactions that are included in the latest block 151. Eventually a blockchain node 104 will solve the puzzle for a part of the ordered pool 154 which includes Alice's transaction 152j). Once the proof-of-work has been done for the pool 154 including the new transaction 152j, it immutably becomes part of one of the blocks 151 in the blockchain 150. Each transaction 152 comprises a pointer back to an earlier transaction, so the order of the transactions is also immutably recorded.

Different blockchain nodes 104 may receive different instances of a given transaction first and therefore have conflicting views of which instance is 'valid' before one instance is published in a new block 151, at which point all blockchain nodes 104 agree that the published instance is the only valid instance. If a blockchain node 104 accepts one instance as valid, and then discovers that a second instance has been recorded in the blockchain 150 then that blockchain node 104 must accept this and will discard (i.e. treat as invalid) the instance which it had initially accepted (i.e. the one that has not been published in a block 151).

An alternative type of transaction protocol operated by some blockchain networks may be referred to as an "account-based" protocol, as part of an account-based transaction model. In the account-based case, each transaction does not define the amount to be transferred by referring back to the UTXO of a preceding transaction in a sequence of past transactions, but rather by reference to an absolute account balance. The current state of all accounts is stored, by the nodes of that network, separate to the blockchain and is updated constantly. In such a system, transactions are ordered using a running transaction tally of the account (also called the "position"). This value is signed by the sender as part of their cryptographic signature and is hashed as part of the transaction reference calculation. In addition, an optional data field may also be signed the transaction. This data field may point back to a previous transaction, for example if the previous transaction ID is included in the data field.

UTXO-Based Model

Figure 2:
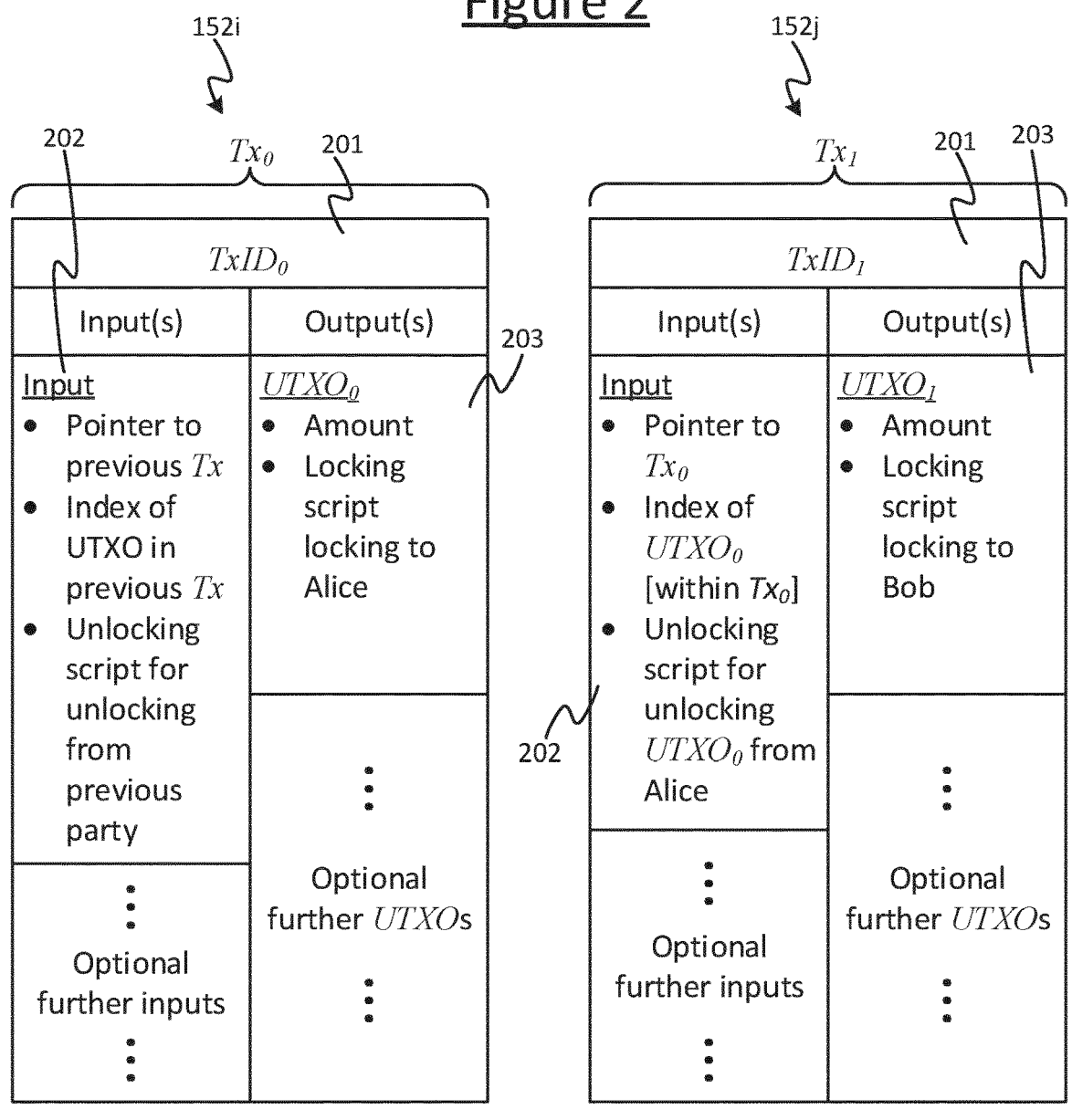
FIG. 2 schematically illustrates some examples of transactions which may be recorded in a blockchain.

FIG. 2 illustrates an example transaction protocol. This is an example of a UTXO-based protocol. A transaction 152 (abbreviated "Tx") is the fundamental data structure of the blockchain 150 (each block 151 comprising one or more transactions 152). The following will be described by reference to an output-based or "UTXO" based protocol. However, this is not limiting to all possible embodiments. Note that while the example UTXO-based protocol is described with reference to bitcoin, it may equally be implemented on other example blockchain networks.

In a UTXO-based model, each transaction ("Tx") 152 comprises a data structure comprising one or more inputs 202, and one or more outputs 203. Each output 203 may comprise an unspent transaction output (UTXO), which can be used as the source for the input 202 of another new transaction (if the UTXO has not already been redeemed). The UTXO includes a value specifying an amount of a digital asset. This represents a set number of tokens on the distributed ledger. The UTXO may also contain the transaction ID of the transaction from which it came, amongst other information. The transaction data structure may also comprise a header 201, which may comprise an indicator of the size of the input field(s) 202 and output field(s) 203. The header 201 may also include an ID of the transaction. In embodiments the transaction ID is the hash of the transaction data (excluding the transaction ID itself) and stored in the header 201 of the raw transaction 152 submitted to the nodes 104.

Say Alice 103a wishes to create a transaction 152j transferring an amount of the digital asset in question to Bob 103b. In FIG. 2 Alice's new transaction 152j is labelled "$Tx_1$". It takes an amount of the digital asset that is locked to Alice in the output 203 of a preceding transaction 152i in the sequence, and transfers at least some of this to Bob. The preceding transaction 152i is labelled "$Tx_0$" in FIG. 2. $Tx_0$ and $Tx_1$ are just arbitrary labels. They do not necessarily mean that $Tx_0$ is the first transaction in the blockchain 151, nor that $Tx_1$ is the immediate next transaction in the pool 154. $Tx_1$ could point back to any preceding (i.e. antecedent) transaction that still has an unspent output 203 locked to Alice.

The preceding transaction $Tx_0$ may already have been validated and included in a block 151 of the blockchain 150 at the time when Alice creates her new transaction $Tx_1$, or at least by the time she sends it to the network 106. It may already have been included in one of the blocks 151 at that time, or it may be still waiting in the ordered set 154 in which case it will soon be included in a new block 151. Alternatively $Tx_0$ and $Tx_1$ could be created and sent to the network 106 together, or $Tx_0$ could even be sent after $Tx_1$ if the node protocol allows for buffering "orphan" transactions. The terms "preceding" and "subsequent" as used herein in the context of the sequence of transactions refer to the order of the transactions in the sequence as defined by the transaction pointers specified in the transactions (which transaction points back to which other transaction, and so forth). They could equally be replaced with "predecessor" and "successor", or "antecedent" and "descendant", "parent" and "child", or such like. It does not necessarily imply an order in which they are created, sent to the network 106, or arrive at any given blockchain node 104. Nevertheless, a subsequent transaction (the descendent transaction or "child") which points to a preceding transaction (the antecedent transaction or "parent") will not be validated until and unless the parent transaction is validated. A child that arrives at a blockchain node 104 before its parent is considered an orphan. It may be discarded or buffered for a certain time to wait for the parent, depending on the node protocol and/or node behaviour.

One of the one or more outputs 203 of the preceding transaction $Tx_0$ comprises a particular UTXO, labelled here $UTXO_0$. Each UTXO comprises a value specifying an amount of the digital asset represented by the UTXO, and a locking script which defines a condition which must be met by an unlocking script in the input 202 of a subsequent transaction in order for the subsequent transaction to be validated, and therefore for the UTXO to be successfully redeemed. Typically the locking script locks the amount to a particular party (the beneficiary of the transaction in which it is included). I.e. the locking script defines an unlocking condition, typically comprising a condition that the unlocking script in the input of the subsequent transaction comprises the cryptographic signature of the party to whom the preceding transaction is locked.

The locking script (aka scriptPubKey) is a piece of code written in the domain specific language recognized by the node protocol. A particular example of such a language is called "Script" (capital S) which is used by the blockchain network. The locking script specifies what information is required to spend a transaction output 203, for example the requirement of Alice's signature. Unlocking scripts appear in the outputs of transactions. The unlocking script (aka scriptSig) is a piece of code written the domain specific language that provides the information required to satisfy the locking script criteria. For example, it may contain Bob's signature. Unlocking scripts appear in the input 202 of transactions.

So in the example illustrated, $UTXO_0$ in the output 203 of $Tx_0$ comprises a locking script [Checksig $P_A$] which requires a signature Sig $P_A$ of Alice in order for $UTXO_0$ to be redeemed (strictly, in order for a subsequent transaction attempting to redeem $UTXO_0$ to be valid). [Checksig $P_A$] contains a representation (i.e. a hash) of the public key $P_A$ from a public-private key pair of Alice. The input 202 of $Tx_1$ comprises a pointer pointing back to $Tx_1$ (e.g. by means of its transaction ID, $TxID_0$, which in embodiments is the hash of the whole transaction $Tx_0$). The input 202 of $Tx_1$ comprises an index identifying $UTXO_0$ within $Tx_0$, to identify it amongst any other possible outputs of $Tx_0$. The input 202 of $Tx_1$ further comprises an unlocking script <Sig $P_A$> which comprises a cryptographic signature of Alice, created by Alice applying her private key from the key pair to a predefined portion of data (sometimes called the "message" in cryptography). The data (or "message") that needs to be signed by Alice to provide a valid signature may be defined by the locking script, or by the node protocol, or by a combination of these.

When the new transaction $Tx_1$ arrives at a blockchain node 104, the node applies the node protocol. This comprises running the locking script and unlocking script together to check whether the unlocking script meets the condition defined in the locking script (where this condition may comprise one or more criteria). In embodiments this involves concatenating the two scripts:

$$<Sig\ P_A><P_A>\|[Checksig\ P_A]$$

where "I I" represents a concatenation and "< . . . >" means place the data on the stack, and "[ . . . ]" is a function comprised by the locking script (in this example a stack-based language). Equivalently the scripts may be run one after the other, with a common stack, rather than concatenating the scripts. Either way, when run together, the scripts use the public key $P_A$ of Alice, as included in the locking script in the output of $Tx_0$, to authenticate that the unlocking script in the input of $Tx_1$ contains the signature of Alice signing the expected portion of data. The expected portion of data itself (the "message") also needs to be included in order to perform this authentication. In embodiments the signed data comprises the whole of $Tx_1$ (so a separate element does not need to be included specifying the signed portion of data in the clear, as it is already inherently present).

The details of authentication by public-private cryptography will be familiar to a person skilled in the art. Basically, if Alice has signed a message using her private key, then given Alice's public key and the message in the clear, another entity such as a node 104 is able to authenticate that the message must have been signed by Alice. Signing typically comprises hashing the message, signing the hash, and tagging this onto the message as a signature, thus enabling any holder of the public key to authenticate the signature. Note therefore that any reference herein to signing a particular piece of data or part of a transaction, or such like, can in embodiments mean signing a hash of that piece of data or part of the transaction.

If the unlocking script in $Tx_1$ meets the one or more conditions specified in the locking script of $Tx_0$ (so in the example shown, if Alice's signature is provided in $Tx_1$ and authenticated), then the blockchain node 104 deems $Tx_1$ valid. This means that the blockchain node 104 will add $Tx_1$ to the ordered pool of pending transactions 154. The blockchain node 104 will also forward the transaction $Tx_1$ to one or more other blockchain nodes 104 in the network 106, so that it will be propagated throughout the network 106. Once $Tx_1$ has been validated and included in the blockchain 150, this defines $UTXO_0$ from $Tx_0$ as spent. Note that $Tx_1$ can only be valid if it spends an unspent transaction output 203. If it attempts to spend an output that has already been spent by another transaction 152, then $Tx_1$ will be invalid even if all the other conditions are met. Hence the blockchain node 104 also needs to check whether the referenced UTXO in the preceding transaction $Tx_0$ is already spent (i.e. whether it has already formed a valid input to another valid transaction). This is one reason why it is important for the blockchain 150 to impose a defined order on the transactions 152. In practice a given blockchain node 104 may maintain a separate database marking which UTXOs 203 in which transactions 152 have been spent, but ultimately what defines whether a UTXO has been spent is whether it has already formed a valid input to another valid transaction in the blockchain 150.

If the total amount specified in all the outputs 203 of a given transaction 152 is greater than the total amount pointed to by all its inputs 202, this is another basis for invalidity in most transaction models. Therefore such transactions will not be propagated nor included in a block 151.

Note that in UTXO-based transaction models, a given UTXO needs to be spent as a whole. It cannot "leave behind" a fraction of the amount defined in the UTXO as spent while another fraction is spent. However the amount from the UTXO can be split between multiple outputs of the next transaction. E.g. the amount defined in $UTXO_0$ in $Tx_0$ can be split between multiple UTXOs in $Tx_1$. Hence if Alice does not want to give Bob all of the amount defined in $UTXO_0$, she can use the remainder to give herself change in a second output of $Tx_1$, or pay another party.

In practice Alice will also usually need to include a fee for the bitcoin node 104 that successfully includes her transaction 104 in a block 151. If Alice does not include such a fee, $Tx_0$ may be rejected by the blockchain nodes 104, and hence although technically valid, may not be propagated and included in the blockchain 150 (the node protocol does not force blockchain nodes 104 to accept transactions 152 if they don't want). In some protocols, the transaction fee does not require its own separate output 203 (i.e. does not need a separate UTXO). Instead any difference between the total amount pointed to by the input(s) 202 and the total amount of specified in the output(s) 203 of a given transaction 152 is automatically given to the blockchain node 104 publishing the transaction. E.g. say a pointer to $UTXO_0$ is the only input to $Tx_1$, and $Tx_1$ has only one output $UTXO_1$. If the amount of the digital asset specified in $UTXO_0$ is greater than the amount specified in $UTXO_1$, then the difference may be assigned by the node 104 that wins the proof-of-work race to create the block containing $UTXO_1$. Alternatively or additionally however, it is not necessarily excluded that a transaction fee could be specified explicitly in its own one of the UTXOs 203 of the transaction 152.

Alice and Bob's digital assets consist of the UTXOs locked to them in any transactions 152 anywhere in the blockchain 150. Hence typically, the assets of a given party 103 are scattered throughout the UTXOs of various transactions 152 throughout the blockchain 150. There is no one number stored anywhere in the blockchain 150 that defines the total balance of a given party 103. It is the role of the wallet function in the client application 105 to collate together the values of all the various UTXOs which are locked to the respective party and have not yet been spent in another onward transaction. It can do this by querying the copy of the blockchain 150 as stored at any of the bitcoin nodes 104.

Note that the script code is often represented schematically (i.e. not using the exact language). For example, one may use operation codes (opcodes) to represent a particular function. "OP_. . . " refers to a particular opcode of the Script language. As an example, OP_RETURN is an opcode of the Script language that when preceded by OP_FALSE at the beginning of a locking script creates an unspendable output of a transaction that can store data within the transaction, and thereby record the data immutably in the blockchain 150. E.g. the data could comprise a document which it is desired to store in the blockchain.

Typically an input of a transaction contains a digital signature corresponding to a public key $P_A$. In embodiments this is based on the ECDSA using the elliptic curve secp256k1. A digital signature signs a particular piece of data. In some embodiments, for a given transaction the signature will sign part of the transaction input, and some or all of the transaction outputs. The particular parts of the outputs it signs depends on the SIGHASH flag. The SIGHASH flag is usually a 4-byte code included at the end of a signature to select which outputs are signed (and thus fixed at the time of signing).

The locking script is sometimes called "scriptPubKey" referring to the fact that it typically comprises the public key of the party to whom the respective transaction is locked. The unlocking script is sometimes called "scriptSig" referring to the fact that it typically supplies the corresponding signature. However, more generally it is not essential in all applications of a blockchain 150 that the condition for a UTXO to be redeemed comprises authenticating a signature. More generally the scripting language could be used to define any one or more conditions. Hence the more general terms "locking script" and "unlocking script" may be preferred.

Side Channel

As shown in FIG. 1, the client application on each of Alice and Bob's computer equipment 102a, 120b, respectively, may comprise additional communication functionality. This additional functionality enables Alice 103a to establish a separate side channel 107 with Bob 103b (at the instigation of either party or a third party). The side channel 107 enables exchange of data separately from the blockchain network. Such communication is sometimes referred to as "off-chain" communication. For instance this may be used to exchange a transaction 152 between Alice and Bob without the transaction (yet) being registered onto the blockchain network 106 or making its way onto the chain 150, until one of the parties chooses to broadcast it to the network 106. Sharing a transaction in this way is sometimes referred to as sharing a "transaction template". A transaction template may lack one or more inputs and/or outputs that are required in order to form a complete transaction. Alternatively or additionally, the side channel 107 may be used to exchange any other transaction related data, such as keys, negotiated amounts or terms, data content, etc.

The side channel 107 may be established via the same packet-switched network 101 as the blockchain network 106. Alternatively or additionally, the side channel 301 may be established via a different network such as a mobile cellular network, or a local area network such as a local wireless network, or even a direct wired or wireless link between Alice and Bob's devices 102a, 102b. Generally, the side channel 107 as referred to anywhere herein may comprise any one or more links via one or more networking technologies or communication media for exchanging data "off-chain", i.e. separately from the blockchain network 106. Where more than one link is used, then the bundle or collection of off-chain links as a whole may be referred to as the side channel 107. Note therefore that if it is said that Alice and Bob exchange certain pieces of information or data, or such like, over the side channel 107, then this does not necessarily imply all these pieces of data have to be send over exactly the same link or even the same type of network.

Client Software

Figure 3A:
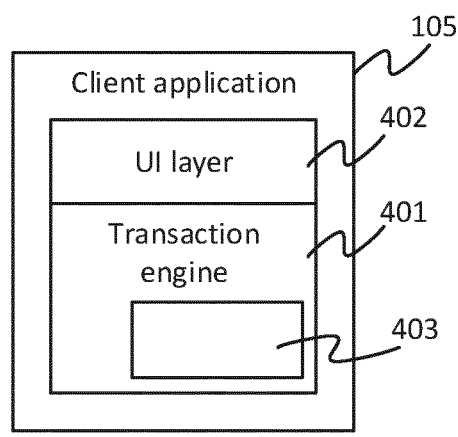
FIG. 3A is a schematic block diagram of a client application.

FIG. 3A illustrates an example implementation of the client application 105 for implementing embodiments of the presently disclosed scheme. The client application 105 comprises a transaction engine 401 and a user interface (UI) layer 402. The transaction engine 401 is configured to implement the underlying transaction-related functionality of the client 105, such as to formulate transactions 152, receive and/or send transactions and/or other data over the side channel 301, and/or send transactions to one or more nodes 104 to be propagated through the blockchain network 106, in accordance with the schemes discussed above and as discussed in further detail shortly.

The UI layer 402 is configured to render a user interface via a user input/output (I/O) means of the respective user's computer equipment 102, including outputting information to the respective user 103 via a user output means of the equipment 102, and receiving inputs back from the respective user 103 via a user input means of the equipment 102. For example the user output means could comprise one or more display screens (touch or non-touch screen) for providing a visual output, one or more speakers for providing an audio output, and/or one or more haptic output devices for providing a tactile output, etc. The user input means could comprise for example the input array of one or more touch screens (the same or different as that/those used for the output means); one or more cursor-based devices such as mouse, trackpad or trackball; one or more microphones and speech or voice recognition algorithms for receiving a speech or vocal input; one or more gesture-based input devices for receiving the input in the form of manual or bodily gestures; or one or more mechanical buttons, switches or joysticks, etc.

Note: whilst the various functionality herein may be described as being integrated into the same client application 105, this is not necessarily limiting and instead they could be implemented in a suite of two or more distinct applications, e.g. one being a plug-in to the other or interfacing via an API (application programming interface). For instance, the functionality of the transaction engine 401 may be implemented in a separate application than the UI layer 402, or the functionality of a given module such as the transaction engine 401 could be split between more than one application. Nor is it excluded that some or all of the described functionality could be implemented at, say, the operating system layer. Where reference is made anywhere herein to a single or given application 105, or such like, it will be appreciated that this is just by way of example, and more generally the described functionality could be implemented in any form of software.

Figure 3B:
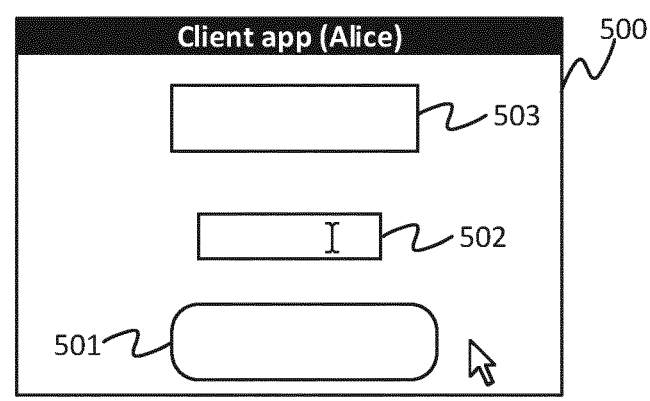
FIG. 3B is a schematic mock-up of an example user interface that may be presented by the client application of FIG. 3A, FIG. 4 schematically illustrates the tree-like structure of keys in an HD wallet, FIG. 5 schematically illustrates the generation of a child extended private key and chain code, FIG. 6 schematically illustrates an example child key derivation function for an HD wallet, FIG. 7 schematically illustrates an example system according to some embodiments of the present invention, FIG. 8 schematically illustrates an external data hierarchical deterministic (EDHD) wallet structure when using random key indexes—the figure illustrates how random outputs (i.e., key indexes in the EDHD wallet) are generated when hash functions are used on some input (i.e. external data), FIG. 9 schematically illustrates transactions generated according to Benford's Law, FIG. 10 schematically illustrates an example of an EDHD wallet structure where key derivation branches are characterised by digital certificates.
Figure 4:
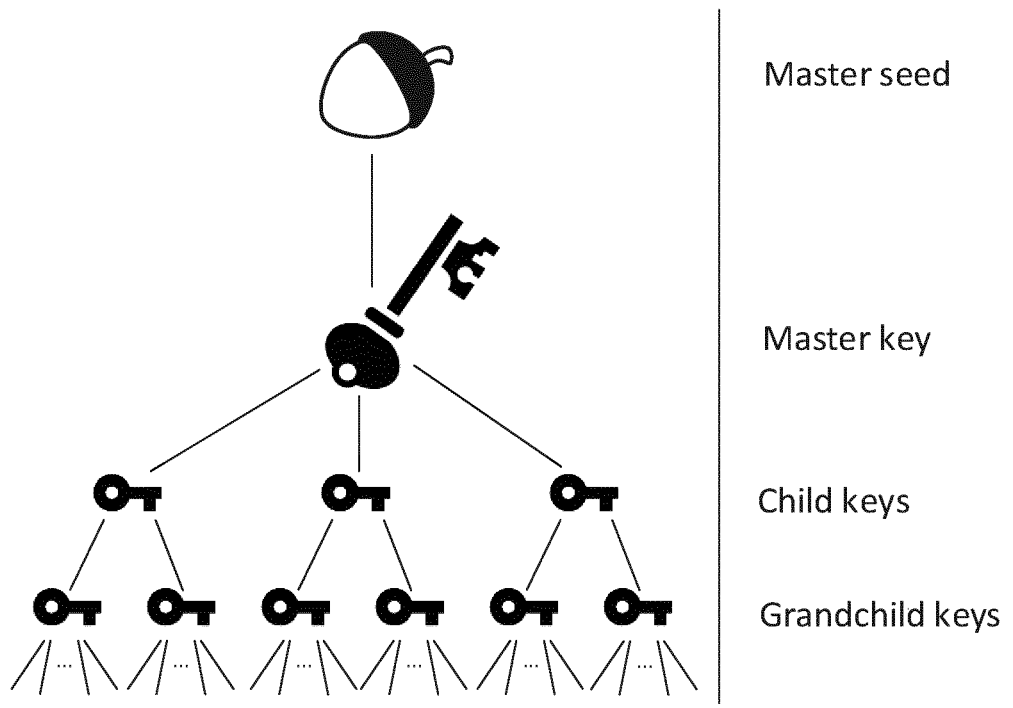

FIG. 3B gives a mock-up of an example of the user interface (UI) 500 which may be rendered by the UI layer 402 of the client application 105a on Alice's equipment 102a. It will be appreciated that a similar UI may be rendered by the client 105b on Bob's equipment 102b, or that of any other party.

By way of illustration FIG. 3B shows the UI 500 from Alice's perspective. The UI 500 may comprise one or more UI elements 501, 502, 502 rendered as distinct UI elements via the user output means.

For example, the UI elements may comprise one or more user-selectable elements 501 which may be, such as different on-screen buttons, or different options in a menu, or such like. The user input means is arranged to enable the user 103 (in this case Alice 103a) to select or otherwise operate one of the options, such as by clicking or touching the UI element on-screen, or speaking a name of the desired option (N.B. the term "manual" as used herein is meant only to contrast against automatic, and does not necessarily limit to the use of the hand or hands). The options enable the user (Alice) to select messages to be used when deriving child keys according to embodiments.

Alternatively or additionally, the UI elements may comprise one or more data entry fields 502, through which the user can enter messages to be used when deriving child keys according to embodiments. These data entry fields are rendered via the user output means, e.g. on-screen, and the data can be entered into the fields through the user input means, e.g. a keyboard or touchscreen. Alternatively the data could be received orally for example based on speech recognition.

Alternatively or additionally, the UI elements may comprise one or more information elements 503 output to output information to the user. E.g. this/these could be rendered on screen or audibly.

It will be appreciated that the particular means of rendering the various UI elements, selecting the options and entering data is not material. The functionality of these UI elements will be discussed in more detail shortly. It will also be appreciated that the UI 500 shown in FIG. 3 is only a schematized mock-up and in practice it may comprise one or more further UI elements, which for conciseness are not illustrated.

HD Wallets

BIP32

The HD wallet protocol according to the BIP32 specification details two core mechanisms:
1. Key derivation—a system for deriving a tree of keypairs from a single seed.
2. Derivation path—defines the wallet structure on top of such a tree.

The following provides an overview of the steps involved in the creation of a HD wallet according to the BIP32 protocol. See https://github.com/bitcoin/bips/blob/master/bip-0032.mediawiki for a complete discussion.

Key Derivation

I. Generate a binary seed. The user first chooses a seed, S, normally a 12-word phrase (between 128 to 512 bits). The specification outlined in BIP39 is commonly employed to generate a binary seed from a mnemonic code. The user may also decide to protect their mnemonic with a passphrase (see BIP39 for further details).

II. Generate a master extended private key. The master private key m is derived from the seed as follows:
  1. Calculate I=HMAC_SHA512(Key="Bitcoin seed", Data=S)=H((Key⊕opad)∥H((Key⊕ipad)∥S)),
  where opad is 128-byte sized outer padding, consisting of repeated bytes valued 0x5c, and ipad is 128-byte sized inner padding, consisting of repeated bytes valued 0x36.
  2. Split I into two 32-byte sequences, $I_L$ and $I_R$.
  3. Use parse256($I_L$) to interpret the 32-byte sequence as a 256-bit number (most significant byte first) master extended private key m and $I_R$ as a 256-bit number master chain code.

III. Generate a child extended private key. Given a parent extended key and a key index i, we can compute the corresponding child extended key. Refer to BIP32 for additional CKD functions to derive public child keys from public and private parent keys. Child private keys $sk_i$ are derived from parent private keys $sk_{par}$ and their corresponding chain code c par using the function:

$$CKD_{priv}((sk_{par}, c_{par}), i) \rightarrow (sk_i, c_i). \quad (3)$$

The following steps take place when executing the function $CKD_{priv}$:
  1. Check whether the key index $i \geq 2^{31}$ i.e., whether the child is a hardened key.
    i. If yes⇒hardened child, use the function:
      $I$=HMAC_SHA512 (Key=$c_{par}$, Data=0x00∥ser$_{256}$($sk_{par}$)∥ser$_{32}$(i)),
    where ser$_{256}$($sk_{par}$) serializes the integer $sk_{par}$ as a 32-byte sequence and ser$_{32}$(i) serializes a 32-bit unsigned integer i as a 4-byte sequence, most significant byte first.
    ii. If no⇒normal child, use the function:
      $I$=HMAC_SHA512 (Key=$c_{par}$, Data=ser$_P$($sk_{par}$·G)∥ser$_{32}$(i)),
    where ser$_P$($sk_{par}$·G) serializes the coordinate pair $sk_{par}$·G= (x,y) as a byte sequence using SEC1's compressed form: (0x02 or 0x03)∥ser$_{256}$(x), where the header byte depends on the parity of the omitted y coordinate.
  2. Split I into two 32-byte sequences, $I_L$ and $I_R$.
  3. The returned child key $sk_i$=parse256($I_L$)+$sk_{par}$(mod n).
  4. The returned chain code $c_i$=$I_R$.

Figure 5:
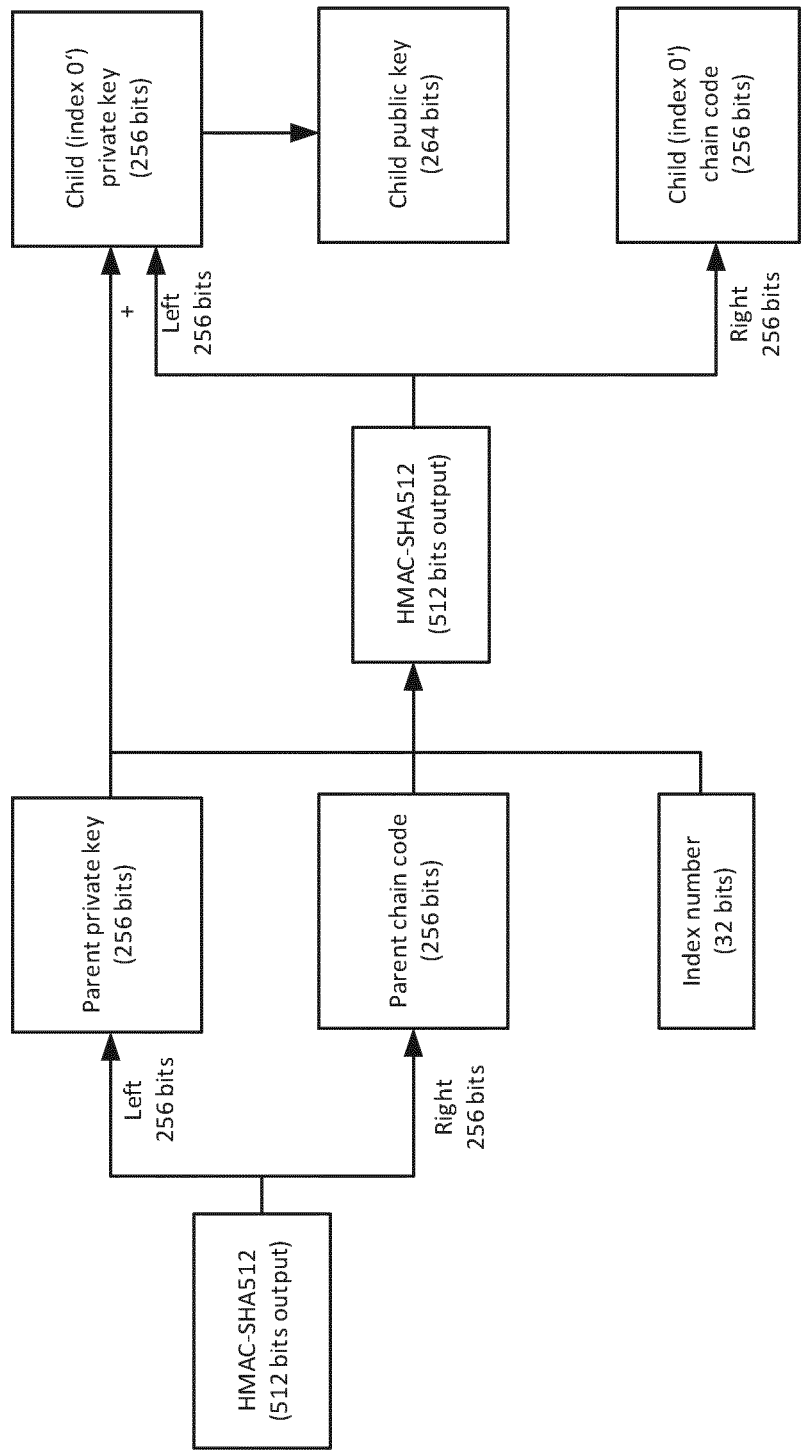

This process is illustrated schematically in FIG. 5.

IV. Serialize extended key format. An extended public (xpub) or private (xprv) key is the base58 encoded serialization of a 78-byte data structure:
  [magic][depth][parent fingerprint][key index][chain code][key]

A description of the individual data elements is summarized in Table 1.

Note that the parent fingerprint is a fast method to detect parent and child nodes in wallet software. Internally, the full 160-bit identifier could be used to deal with any hash collisions in the fingerprint.

TABLE 1

The data elements used in the base58 encoded serialization of the extended key.

| Data | Size | Type | Description |
| --- | --- | --- | --- |
| Magic | 4 bytes | uint32_t | A version number that indicates the network it belongs to and whether the key is public or private.<br>Mainnet (x): 0x0488B21E public ("(xpub)")<br>0x0488ADE4 private ("(xprv)")<br>Testnet (t): 0x043587CF public ("(tpub)",),<br>0x04358394 private (tprv). |
| Depth | 1 byte | uint16_t | A number that indicates how deep an xprv or xpub is in a derivation path. It is incremented by one for each level in the path up to a maximum of 0xFF.<br>Master nodes: 0x00<br>Level-1 derived keys: 0x01<br>Level-2 derived keys: 0x02, . . . |
| Parent fingerprint | 4 bytes | uint32_t | The first 4 bytes of the hash160 of the public key of the parent.<br>Master key: 0x00000000 |

TABLE 1-continued

The data elements used in the base58 encoded serialization of the extended key.

| Data | Size | Type | Description |
| --- | --- | --- | --- |
| Key index | 4 bytes | uint32_t | The child number, which is used to distinguish between normal versus hardened keys, with prepended zeros. This is $ser_{32}(i)$ for index i in $x_i = x_{par}/i$, with the key $x_i$ being serialized. Master key index: 0x00000000 Maximum key index: 0xFFFFFFFF |
| Chain code | 32 bytes | char[32] | An extra 256 bits of entropy extending both private and public keys in order to prevent child keys from depending solely on parent keys. |
| Key | 33 bytes | char[32] | A public or private key. Private keys are prepended with a single 0x00 byte so that the length stays the same as public keys. Public key (pk): $ser_P(pk)$ Private key (sk): 0x00 ∥ $ser_{256}(sk)$ |

A 32-bit checksum (derived from the double SHA-256 checksum) is first added before converting to the base58 representation, which results in a string of up to 112 characters starting with either "xprv" or "xpub" on mainnet, or "tory" or "tpub" on testnet.

When importing a serialized xpub, implementations must also verify whether the X coordinate in the public key data corresponds to a point on the curve. If not, the extended public key is deemed invalid.

Derivation Path

The 32-bit key indexes i range from 0x00 to 0x7fffffff (0 to $2^{31}-1$) for normal keys, and 0x80000000 to 0xffffffff ($2^{31}-2^{32}$) for hardened keys. The subscript notation ($i_h$) or, more commonly, the prime symbol is used to indicate hardened keys. Blockchain developers typically use the ASCII apostrophe rather than the unicode prime symbol. For example, the first normal key (0x00) is i=0 and the first hardened key (0x80000000) is i'=0'.

Figure 6:
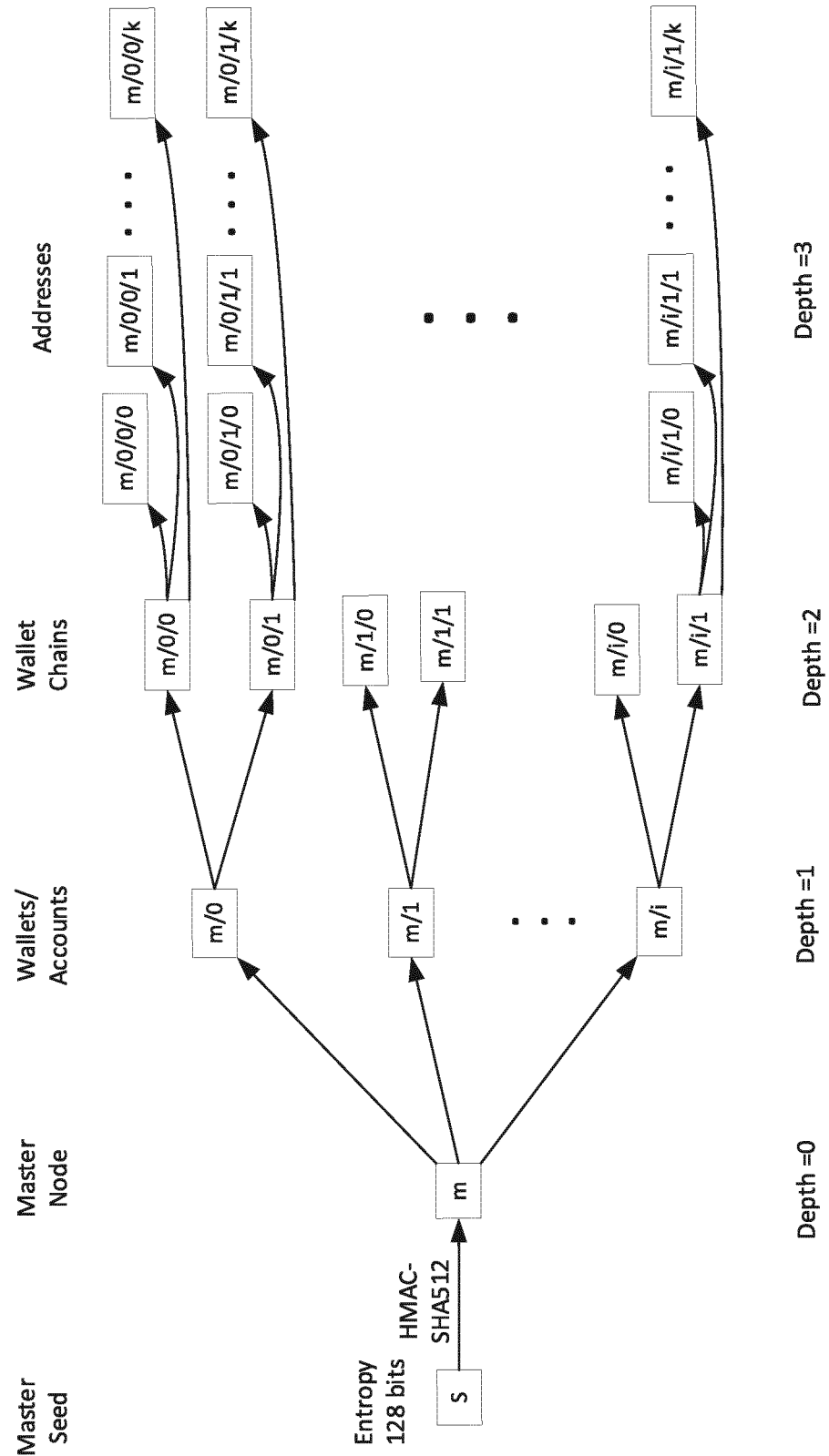

FIG. 6 illustrates the child key derivation path in the schematic taken from the BIP32 specification. The derivation path is defined as an n-tuple of n key indexes separated by '/'. For BIP32 HD wallets, the path consists of 3 levels or depths (m/i/j/k) and is defined as:

m/account'/change/ address_index

The first level i after the master private key m encompasses the disclosed BIP32 wallet structure. Here the key space can be split so that the user can organise their funds into different 'accounts' in analogy with traditional bank accounts e.g., for different divisions of an organization. The default account is number 0' (hardened key index) and is increased sequentially.

In the second level j, each account is composed of two keypair chains: an internal and an external one. The external keychain (a constant index of j=0) is used to generate new public receiving addresses, while the internal keychain (a constant index of j=1) is used for all other operations, such as change addresses or anything that does not need to be communicated externally.

The final level k denotes the addresses that are numbered from index 0 and increase sequentially.

BIP43—Purpose Field

The BIP43 specification (https://github.com/bitcoin/bips-iblob/masteribip-0043.mediawiki) was introduced to standardise the fields in the tree-structure defined in BIP32. Specifically, it redefines the first level following the master key as a special purpose field. The derivation path is defined as:

m/ purpose'/* where * denotes the following levels depending on the data in the purpose field. If this is set to zero (i=0'), we can expect there to be two more levels in the derivation path since this is the default BIP32 wallet structure.

BIP44—Multi-Account Hierarchy

An application of BIP43 in which the purpose field is set to 44' corresponds to a pre-defined five-tier tree structure in accordance with BIP44 (https://github.com/bitcoin/bips-iblob/masteribip-0044.mediawiki). Specifically, it introduces the handling of multiple coins within different branches of a HD wallet, with the default value being assigned to bitcoin (j=0'). Here, the derivation path is defined as:

m/purpose'/coin_type'/account'/change/address_index

Address Gap Limit

BIP44 introduces the concept of an address gap limit for the purposes of account discovery. A wallet's software can be programmed to stop searching for consecutive unused addresses beyond a certain limit. This is because the address index is increased sequentially. The gap limit is not standardized and is often be user configurable. Conventionally, it is set to 20 keys, although some wallets set a limit of 100 or even 1000 keys. Note that the gap limit only applies to sibling keys rather than parent-child keys. The search is often limited to 2 levels deep assuming that a standard derivation path is used.

Account Discovery:

When a user imports their seed from an external source, a wallet's software can use the address gap limit to discover accounts in the following manner:

1. Set index=0.
2. Derive the account's node corresponding to the index.
3. Derive the external chain node of this account.
4. Scan addresses of the external chain; respect the gap limit.
5. If no transactions are found on the external chain, stop discovery.
6. If there are some transactions, increase the account index by one and repeat from step 2.

Since internal chains only receive coins that come from the associated external chains, the scan of the blockchain involves external chains only. Wallet software should warn when the user is trying to exceed the gap limit on an external chain by generating a new address.

Wallet Recovery

Different wallet providers have different protocols in place to recover funds during wallet restoration. Companies who offer HD wallet services to exchanges can easily have thousands of unused consecutive addresses and generally ignore the gap limit disclosed in BIP44. They instead maintain a list of all generated addresses and index them individually rather than as a HD wallet data structure. Maintaining a cache of known transactions in this way removes the need to re-query the blockchain every time a user logs in to the software, making the process more time efficient while also allowing lightweight clients to scale-up their user capacity with just a handful of nodes.

Wallet providers that track UTXOs or entire transactions tend to store this information in a wallet server. HD wallets relying on a full node can maintain a full index of transactions, while a system of servers is likely to keep a running index that is appended to with each new address. For every block that is published, the wallet software will check each transaction in the new block against each address in the wallet server. This process is made more efficient using pre-indexed data and/or with the help of bloom filters.

Deriving Child Keys

Embodiments of the present invention provide a novel way of deriving child keys of a hierarchical key structure. In general the hierarchical key structure comprises a plurality of levels, with each level comprising one or more keys that are linked to at least one key of a preceding level. An exception to this is the very first level, normally referred to as the master level, which comprises a master key. The master key is typically derived from a seed which may be any arbitrary data. After the master level there are one or more child levels. A key in the n−1th level may be a parent key of one or more child keys in the nth level. Similarly, a key in the nth level, whilst being a child key of a parent key in the n−1th level, may also be a parent key of one or more child keys in the n+1th level. Not all keys in a given level must be a parent key. For instance, the key structure may have many branches of keys that trace back to the master key. Some branches may be longer than others, meaning that those branches include keys belonging to a level higher (i.e. greater, further or deeper) than other branches.

Figure 7:
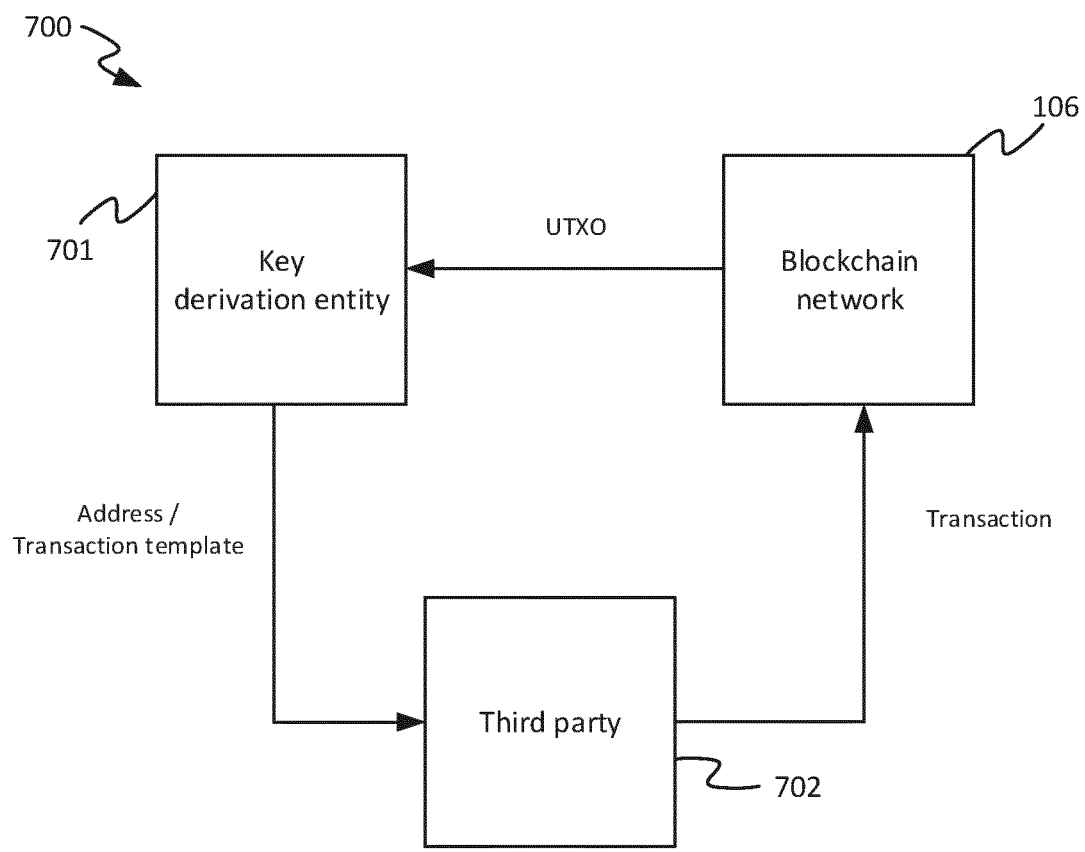

FIG. 7 illustrates an example system 700 for implementing embodiments of the present invention. The system comprises a key derivation entity 701 configured to derive one or more child keys of a key structure. Whilst BIP32 is provided as an example protocol for deriving a key structure, the key derivation entity 701 is not restricted to deriving keys that conform to that protocol. For instance, the length of keys derived by the key derivation entity 701 may differ from that required by BIP32. Conversely, the key derivation entity 701 may derive keys that do conform to the BIP32 in every requirement. Moreover, the keys derived by the key derivation entity 701 need not be used as signing keys for signing blockchain transactions or as public keys for use as blockchain addresses, e.g. for pay-to-public-key hash (P2PKH) addresses.

In some examples, the key derivation entity 701 may be configured to perform some or all of the operations attributed to Alice 103a (or indeed Bob 103b) as described with reference to FIGS. 1 to 3. The system may comprise one or more nodes 104 of a blockchain network 106. Additionally or alternatively, the system may comprise one or more third parties 702, e.g. users, organisations, machines, etc. In some examples, at least one third party 702 may be configured to perform some or all of the operations attributed to Alice 103a (or indeed Bob 103b) as described with reference to FIGS. 1 to 3.

The key derivation entity 701 has an existing key structure that comprises one or more parent keys. The master key is a parent key to one or more child keys. One or more child keys belonging to a deeper level of the key structure may themselves be a parent key to one or more child keys. For instance, a parent of a child key may itself be the child key of the master key. Alternatively, the key derivation entity 701 generates a key structure for the first time, wherein the generated key structure includes at least one parent key. The key structure is generated based on a seed. Specifically, the master key is generated based on the seed, and all other keys are derived, at least indirectly, from the master key.

The key derivation entity 701 has a message that it wants to link to a child key of the key structure. The message may be any type of external data. Here, external data means data that is not normally required to derive a child key. For instance, a parent key would not be classed as external data because a parent key is always required in order to derive a child key. Examples of external data include communication messages (texts, emails, etc.), personal identifiers (e.g. names, date of birth, address, passport number, etc.), invoices, text documents (e.g. legal documents), etc.

The message is used to derive an index, which in turn is used to derive a child key. The index is based on (i.e. function of) a hash of the message. In other words, the message is hashed and the result is used to generate the index. In some examples, the result is the index. In other examples, one or more additional operations are performed on the result to generate the index. An example of an additional operation would be a modulo operation, which may be used to convert the hash result into an index of a particular size, if required. It is also not excluded that other operations may be performed to convert the hash result to a certain size. For instance, if a 4 byte index is required, the first 4 bytes of the hash result may be selected. A different selection may be made, e.g. taking the final 4 bytes.

Any hash function (e.g. SHA256) may be used to hash the message. In some examples, more than one hash function may be applied to the message, and/or a given hash function may be applied to the message more than once.

Having generated the index, the key derivation entity 701 derives a child key based on (i.e. as a function of) the parent key and the index. More specifically, the child key is based on the parent key and a hash of at least the parent key and the index. That is, generally the child key $sk_i$ is derived as:

$$sk_i = f(sk_{par}, \text{hash}(sk_{par}, i))$$

where f( ) is a child derivation function and sk par is the parent key. Note that whilst $sk_i$ normally denotes to a private key, other key types may be used, e.g. a public key.

In some examples, the child key is derived by summing the parent key and the hash result:

$$sk_i = sk_{par} + \text{hash}(sk_{par}, i)$$

where + denotes elliptic curve addition.

The hash function may be any hash function, and may or may not be the same hash function that is used to generate the index. In some examples, the child key may be based on a part (i.e. component) of the hash result. For instance, the hash result may be larger than the key size required by the key derivation entity 701. In that case, the key derivation entity 701 may take part of the hash result (e.g. the left n bytes) and use that part as the child key. In examples where a chain code is required to derive keys (discussed next), another part (e.g. the remaining part) of the hash result may be used as the chain code of the child key.

The child key may be a function of the chain code of the parent key $c_{par}$, i.e.:

$$sk_i = f(sk_{par}, \text{hash}(sk_{par}, c_{par}, i))$$

In general, keys of a key structure are derived based on a parent key and a hash result (the hash result being based on the parent key and the index, and in this example a chain code of the parent key). The chain code of a child key is a part of the hash result, where the other part of the hash result is used to derive the child key itself. The chain code is added entropy that ensures that the child key does not depend directly on its parent key.

Having derived the child key, the key derivation entity 701 may choose to store the message (which was used to generate the index), or discard the message. Similarly, having used the child key for a particular purpose, the key derivation entity 701 may choose to store the child key (and/or the chain code) or discard it.

As mentioned above, any suitable hash function may be used to generate the child key. As a particular example, the hash function may be a HMAC function, e.g. HMAC-512. Other HMAC may be used depending on the required key length. A HMAC takes two inputs. As an example, one input may be the parent chain code, and the other input may be a concatenation of the parent key and the index. Other combination of inputs may be used, e.g. parent key as one input, chain code concatenated with the index as the other input, or parent key as one input and the index as the other input.

The skilled person will be familiar with public-private key pairs. Briefly, a public key is generated by applying a function to a private key, e.g. elliptic curve multiplication of a generator point. The key derivation entity 701 may use the described techniques to generate private keys or public keys.

In some examples, the parent key used to derive the child key is a private key. The resulting child key is also a private key. Such keys are often referred to as hardened keys and may be given by:

$$sk_{child} = sk_{parent} + \text{HMAC-SHA512}_L(c_{parent}, sk_{parent} \| \text{index})$$

Note that the hash function may take other forms.

In other examples, the parent key used to derive the child key may be a public key. In this case, the child key is derived based on the parent key and a public key corresponding to the hash result. That is, the hash result is converted into a public key, and the child key is based on that public key, e.g.:

$$pk_{child} = pk_{parent} + \text{HMAC-SHA512}_L(c_{parent}, pk_{parent} \| \text{index}) \cdot G$$

where $\cdot G$ denotes elliptic curve multiplication by a generator point.

In yet other examples, the parent key outside of the hash function may be a private key, whilst the parent key input to the hash function may be a public key. The resulting child key is a private key. Such keys are often referred to as non-hardened keys and may be given by:

$$sk_{child} = sk_{parent} + \text{HMAC-SHA512}_L(c_{parent}, pk_{parent} \| \text{index})$$

The key derivation entity 701 may derive a public key corresponding to the child private key, e.g.

$$pk_{child} = sk_{child} \cdot G$$

Rather than being keys of an asymmetric cryptography scheme, the keys may instead be keys of a symmetric scheme.

In general the child key derived by the key derivation entity 701 may be used for any suitable application, e.g. encryption and decryption of messages. E.g. a child public key may be used to encrypt a message, or a child private key may be used to decrypt a message that has been encrypted with the corresponding child private key. In the case that the child key is a symmetric key, the same child key may be used to encrypt and decrypt messages.

The child key may also be used to generate digital signatures. That is, the child key may be a private key used to generate a digital signature based on a message and the private key. The signature may be verified using the corresponding public key.

One application that the child key may be used for is in the context of blockchain transactions. For instance, the child key may be a public key to which an output of a blockchain transaction is locked, e.g. using a P2PK or P2PKH output. The key derivation entity 701 may generate a transaction comprising an output that is locked to the child key. Alternatively, the key derivation entity 701 may provide the child key to a third party 702, and that third party 702 may generate a transaction comprising an output locked to the child key. The key derivation entity 701 may provide the third party 702 with the child key itself, or with a blockchain address based on the child key, e.g. a hash of the child key. Note that generating the transaction may comprise generating a transaction template that is missing at least one field. The transaction template may be passed to the third party 702 or the key derivation entity 701 for completion, depending on who generated the transaction template. The complete transaction may then be transmitted to the blockchain network 106.

If the blockchain comprises a transaction locked to a child public key, the key derivation entity 701 may generate a transaction comprising an input that references and is configured to unlock that output. The input may comprise a signature generated using the corresponding child private key. Depending on the locking script of the referenced output, the input may also comprise the child public key.

The key derivation entity 701 may want to, or be required to, prove to a third party 702 that the child key has been generated based on the message. The information required to prove the link depends on how the child key was derived. At the very least, the parent key and the message are required. The key derivation entity 701 may transmit one or both data items to the third party 702, e.g. depending on whether the third party 702 already has access to the parent key or the message. For instance, the parent key may be a public key which is known to the third party 702. The third party 702 may generate the index based on the message, i.e. by hashing at least the message. The parent key and the index may then be hashed, and then combined with the parent key to derive the child key. If the child key is derived using a chain code of the parent key, the third party 702 will also require knowledge of the chain code, which may be provided by the key derivation entity 701.

As an optional feature, the key derivation entity 701 may embed a digital certificate into the key structure. A digital certificate is issued to a party by a certificate authority and certifies a data item as belonging to or being otherwise associated with a particular party. In this case, the digital certificate is issued to the key derivation entity 701 (or at least the party operating the key derivation entity 701). The digital certificate may certify a key as belonging to the key derivation entity 701. The certified key may be a key of the key structure, e.g. the master key. The digital certificate may be embedded in the key structure by generating the index of the child key based on the digital certificate. In other words, the message used to generate the index of the child key may comprise the digital certificate. The digital certificate may belong to the key owner (i.e. the key derivation entity 701) or the sender of the funds and/or may include a message in addition to the certificate e.g., to create a link between an invoice and a person paying the invoice for auditing reasons. Certifying a key provides cryptographic proof of an identity while embedding a digital certificate into the key derivation function (via the index) does not; but it does create a link between a key and someone's identity e.g., for auditing purposes.

Additionally or alternatively, the master key may be a certified key. That is, the master key may be certified but it need not be embedded in the key structure. Note that certified keys are normally public keys since the party whose key is being certified does not wish to reveal their private keys. This provides a holistic solution to the idea of auditing invoices via HD wallets by linking the key owner's identity to the wallet.

Returning now to the derivation of child keys, the key derivation entity 701 may derive a plurality of different child keys. Each child key may be derived as described above. That is, each child key may be derived based on a respective index, with that index being based on a message. In some examples, a different message is used for each newly derived child key. Alternatively, the same message may be used for different keys. However in that case the child key must have a different parent key so as to ensure that no two child keys are the same.

Some of the child keys may have the same parent key. That is, some of the child keys derived using the described techniques may be derived at the same level of the key structure and be linked to the same parent key. Some of the child keys may have a different parent key, but the different parent keys belong to the same level of the key structure, such that their child keys belong to the same level. Some of the child keys may have a parent key belonging to a different level of the key structure. In this case, child keys derived directly based on a message will exist at different levels of the key structure. It is also not excluded that some of the newly derived child keys may be children of the previously derived child key. That is, a child key derived directly based on a message may be a parent to one or more child keys that are also generated directly based on a respective message.

In some examples, when deriving multiple child keys based on the same parent key, the same message may be used to generate the index, but the message may be concatenated or otherwise combined with a different data item. That is, the index is based on a hash of the message and the data item. The data item may be a counter value which is incremented for each additional child key. For example, the index of a first child key may be the hash of a message concatenated with a first counter value (e.g. zero), the index of a second child key may be the hash of a message concatenated with a second counter value (e.g. one), and so on.

In other examples, the respective message used to generate the index of different child keys may be a respective part of the same overall, larger message. For instance, an overall message may be split into several chunks, and then each chunk of the message is used to generate a respective index to be used for deriving a respective child key.

In some other examples, a child key whose index is based on the hash of a message may be a parent to one or more child keys whose respective indices are generated in the conventional sense of using incrementing values of a sequence, e.g. as in BIP32. In these examples, the key derivation entity 701 may choose to derive child keys of only a single level in the key structure based on a message.

The key derivation entity 701 may send one or more of the plurality of child keys to a third party 702. The key derivation entity 701 may additionally or alternatively generate a respective blockchain address for each of the plurality of child keys, and send those addresses to the third party 702. The addresses may be included in one or more transaction templates, e.g. one template for each address.

The key derivation entity 701 may generate one or more blockchain transactions (which may be transaction templates), each having at least one output locked to one of the derived child keys. Each transaction may comprise a single output locked to a respective one of the child keys, or one or more transactions may comprise more than one output locked to a respective one of the child keys. The key derivation entity 701 may send the transactions to the blockchain network, or to a third party 702. The number of transactions and outputs of those transactions may be based on the techniques described in UK patent application GB1913667.0.

Further specific examples of the described embodiments will now be discussed.

External Data HD Wallet We disclose a new way to include external data (ED) in the derivation of keys in a HD wallet ('EDHD wallet'). Instead of including an external message explicitly in the calculation of a private-public keypair, we disclose that an external message is mapped to indexes in key derivation paths within an HD wallet.

A user (i.e. key derivation entity 701) can either allocate an HD wallet that is only used for keys dependent on external data, or incorporate external data in a pre-existing wallet by dedicating entire branches to keys that correspond to external data. In the example of FIG. 6, a branch goes from left to right starting from the master node (i.e. master key). E.g. one branch shown in FIG. 6 is made up the following nodes: m, m/0, m/0/0, m/0/0/0. Another branch is made up of the following nodes: m, m/i, m/i/1, m/i/1/1.

For example, if the derivation path follows BIP44 then a user might choose the account index (depth 3) to incorporate account-related external data to all the derived child keys in that branch. Alternatively, one could associate the address index (depth 5) to individual invoices within a branch. We will explore the implications of incorporating external data at different depths and along different branches of a HD wallet below.

To derive specific keys within a wallet, we disclose the following calculation. Assume we have a message that we would like to use to leave a fingerprint on a public key, we first compute the hash (e.g., using the SHA256 hash function) of the message m modulo $2^{32}$ $$\text{index}=\text{hash}(m)\bmod 2^{32} \quad (4)$$

such that this can then be used as the index of a child key in the HD wallet derivation. Note that the hashed message modulo $2^{32}$ is given by the right 4 bytes of the result of the SHA256 hash function. We restrict the result to the range $0 \leq \text{index} < 2^{32}$ for the purpose of recovering the keys. Note that this is specific to BIP32 wallets, and a different range of possible index values may be chosen for other protocols. For example, if the index can take a value in the range given by 5 bytes, then the index would be given by $\text{index}=\text{hash}(m) \bmod 2^{40}$.

We then choose the key which depends on this message to be defined as Equation (1) or (2) for normal and hardened keys, respectively. N.B. we are not changing HD wallet protocol here; we are simply giving meaning to indices.

Note that in the HD wallet protocol, indices up to $2^{31}$ are reserved for normal keys, and indices above $2^{31}$ are used for hardened keys. Since we have chosen to restrict the range to $2^{32}$, there is an equal chance of a child key being hardened or normal in this protocol. If one would like to explicitly choose whether they would like a hardened or normal key, we simply modify the index calculation to be $$\text{index} = \text{hash}(m) \bmod 2^{31} \tag{5}$$

for normal keys, and $$\text{index}' = (\text{hash}(m) \bmod 2^{31}) + 2^{31} \tag{6}$$

for hardened keys. These ranges mean that normal key indexes always start with 0 while hardened key indexes always start with 1 in binary representation, since the index is always exactly 32 bits in length. This completes the description of how to map external data to specific keys.

Figure 8:
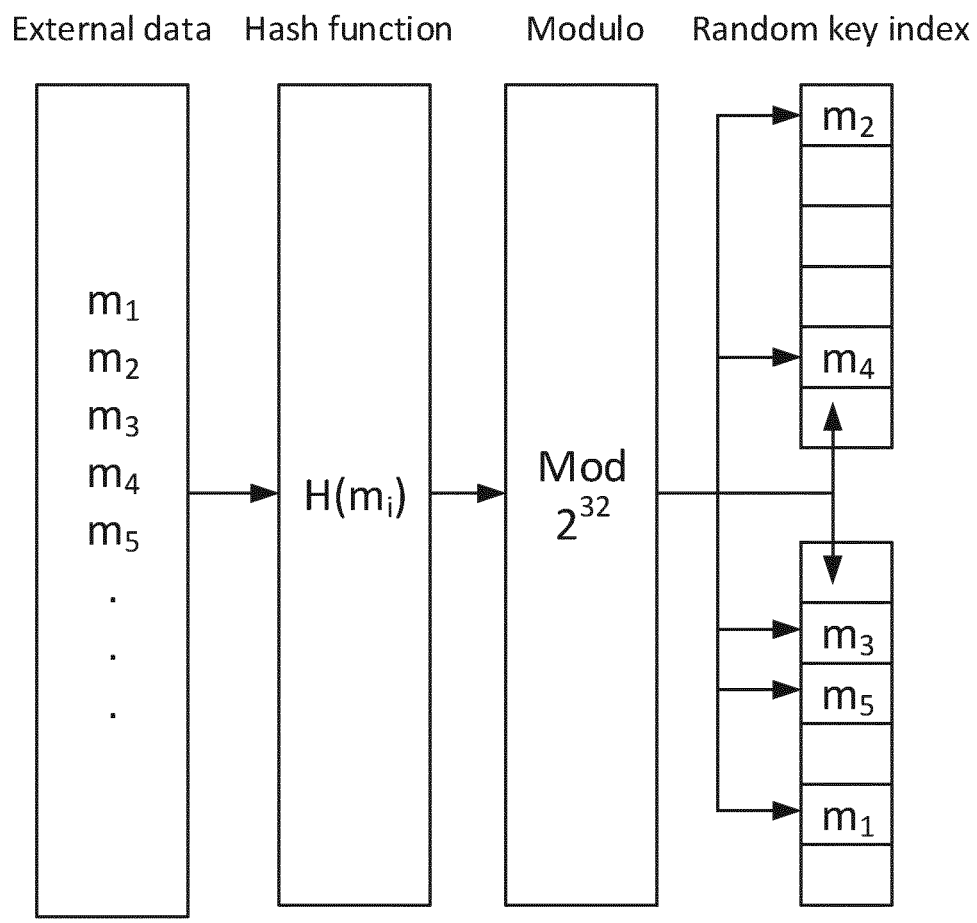

FIG. 8 illustrates the resultant wallet structure when generating key indexes in this way. Since the hash of some data produces an unpredictable output, the key index in an EDHD wallet is generated at random instead of being incrementing sequentially as is the case in traditional HD wallets.

External Data Audits

Based on the example definition above, a merchant (an example of a key derivation entity 701) has the space to generate over 2 billion invoices per year. This is more than sufficient for a large consumer devices company or "tech giant" making desktop and laptop computers, tablets, smartphones and smart speakers, for example, who may sell of the order of hundreds of millions of devices per year. Large companies might generate a new EDHD wallet each year once they have completed their financial audits for that tax year.

Recall that one of the reasons for introducing external data into the calculation of key pairs is for auditing purposes, providing a provable link between external data and digital keys. In order to prove that a child key is derived from external data in this case, one needs to provide the index used in the child key derivation to an auditor (e.g. third party 702). This requires sharing the preimage of the HMAC512 function, and so the parent key must also be shared. For hardened keys, this means sharing a parent private key, which is not advisable in blockchain standards and we recommend that this should not be done. One approach to resolving this issue is simply imposing that EDHD wallets only contain normal keys, so that all the keys can be audited easily. This is done by restricting the range of the result to only include normal keys, as shown in Equation (5).

A second approach is to modify the BIP32 procedure to simplify the auditing of hardened keys. This was demonstrated in Benford's wallet, where an additional step was added to include an invoice message in a HMAC256 calculation. This method creates a provable link between a public key and an invoice; however, it cannot be used to prove that a child key is linked to a parent key.

A third approach is to assume that the HD wallet protocol is secure. Practically, this means that there is an industry standard of how HD wallets are derived, and no one can change this. Currently, the serialization format of HD wallet keys (which is stored in the wallet software but does not appear in on-chain transactions) includes 4 bytes that indicate the index corresponding to that key with respect to its derivation from its parent key. If we can assume that this index is correct, then hardened keys can be audited by verifying that the index given in this location corresponds to the correct external data. This assumption is also linked to the expectation that a wallet provider would be incentivised to act honestly to maintain their reputation.

In general, the requirements of an auditor are much lower than the requirements of a cryptographic proof. Ultimately, an auditor only requires some form of evidence that the invoices provided by a merchant are valid. Using an EDHD wallet with hardened keys still gives a merchant the means to identify their public keys associated with a particular invoice. The merchant can give these to the auditor along with the invoice(s) and sufficiently convince them of their validity because the output value will sum up to the invoice value. Therefore, it is at the user's discretion whether they wish to employ any of the suggested approaches above for auditing purposes.

The solution we have disclosed allows HD wallets to depend on external data such that they can be audited. Notably, this solution still allows for keys to be recovered in the case of loss, without the need to know the relevant external data.

Restrictions of the Gap Limit

The EDHD wallet protocol adopts the benefits of HD wallet recovery in which all private/public keypairs can be regenerated from the seed alone. To ensure that a wallet is never lost, one can store the seed securely (or split the seed in shares and spread the shares out for security). To regenerate the keys in a wallet, most wallet implementations search the UTXO set stored in a wallet server (storing a user's transaction history eliminates the need to scan the blockchain) until they hit the address gap limit that is conventionally set to 20 according to the BIP44 guidelines. This means that if there exist 20 consecutive addresses that have not received payment, the wallet software halts the search process and assumes that there are no more keys in the wallet.

Consider the scenario in which Alice, a corporate HD wallet user, generates and distributes 20 receiving addresses to her clients (the maximum possible for a gap limit of 20). She awaits payment from her clients but none of them respond to her payment request, and Alice needs to generate more addresses for some new potential clients.

If a user generates 20 addresses in quick succession in this way, the wallet software must be programmed so that the $21^{st}$ generated address wraps around and re-uses the $1^{st}$ generated address.

Under normal conditions, addresses are not re-used, and every payment is allocated a new address. This is in accordance with best cryptographic practices for secure digital key management.

This simple example above highlights the restrictive nature of sequential address generation, which is a core requirement for wallets implementing an address gap limit. However, a wallet's software can work around this issue with a trade-off in cryptographic security.

The address gap limit remains problematic when migrating a seed between different wallet services due to differences in each wallet provider's recovery processes. As a result, tracing addresses in the wallet server may not work if the user decides to use a new wallet provider. The restrictive nature of the gap limit can therefore prove cumbersome for users who would need to investigate whether wallet migration is a possibility in advance.

EDHD Wallet Recovery

We now consider a merchant who has an EDHD wallet and a collection of invoices. The merchant backs up their seed with a trusted third party 702 and uses their wallet for daily business. If the merchant loses their wallet data file but still has the invoices, they can immediately identify which public key or set of keys in the case of a Benford-EDHD wallet were used for each invoice using their backed-up seed and set of invoices.

If the merchant loses both the wallet data file and invoices, wallet recovery is still possible by checking by brute force which public keys have been used, since there is only a list of $2^{32}$ indexes to check. That is, the merchant may generate all possible addresses and check whether there is a UTXO paid to any of those addresses. Note that if all the invoices are lost, the full recovery of all the keys in an EDHD wallet necessitates the removal of the address gap limit so that the software searches for all addresses in the 4-byte range. In terms of security, the invoices themselves do not have to be as secure as the wallet seed since leaking the invoices would only result in a loss of some privacy that would not be detrimental to the merchant.

There is the additional option of storing the external data used in the child key derivation, such that there exists a list of indexes that should be derived. One could store the indexes explicitly or mnemonics that correspond to each index as described by BIP39. If this data becomes compromised, there is no way for an adversary to identify specific addresses or transactions unless they know the parent key in the derivation path. In the case of the external data corresponding to invoices, these must be stored anyway for auditing purposes, thus there is no extra work to store the external data.

In terms of wallet migration, the fact that the wallet data file is derived deterministically from the seed and invoices makes transferring between wallets very simple. This is because the indices used to calculate the keys are known or can be calculated from the invoices. This is because the seed and invoices are the only pieces of data required and everything else (i.e. the regeneration of keys) follows deterministically. This is currently a severe limitation for users wishing to migrate their seed from different wallet providers due to the differences in key derivation path as described above.

Features and Benefits

Several unique benefits currently unavailable to wallet users arise when the wallet data file is derived deterministically from the seed and invoices (or more generally other external data). As mentioned above, one of these is the ability to easily migrate between different wallet providers. Another is that we can now identify keys in advance of receiving funds because we have generated the key using an invoice, instead of depending on whether a key has been used in any sequential order. Embodiments of the invention can be exploited to provide any one or more of the following examples:
  Scalable—Not confined by the sequential nature of conventional HD wallets.
  Customisable—Added flexibility of including external data for different purposes.
  Recoverable—Transactions and invoices can be recovered from the seed alone.
  Interoperable—Easy transfer of data between different wallet providers.
  Auditable—Presents a novel way of identifying and structuring keys in a wallet.

Theoretical Benchmarking

We now provide a series of theoretical analyses in response to issues related to wallet recovery as well as risks of potential hash collisions when using our disclosed indexing solution for external data. Unless explicitly stated, the theoretical investigations that follow are based on four assumptions:

a) We do not know the address gap limit,
b) We do not know the key derivation path,
c) We only ever use P2PKH scripts to generate addresses, and
d) We have access to the entire UTXO set, which is stored in a wallet server.

Wallet Recovery

Recovery of the private-public keypairs used in an EDHD wallet involves two steps:
  1. Generate all the possible keys using all the possible derivation paths, and
  2. Verify which keys are active (keys that are associated with unspent transactions).

In the following, we analyse the computational complexity for bruteforcing all the possible keys of a wallet using two approaches: Account/Index bruteforcing and Message bruteforcing.

Account/Index Bruteforcing

Theoretically, an infinite number of keys can be generated by adding new levels to the derivation path. In the identification of the active keys we assume that BIP44 is used, where the first 3 levels are fixed. For example, in the case of Bitcoin the first 3 levels are m/44'/0', followed by the account (only hardened addresses), the change (always 0) and the address index. For this reason, bruteforcing a wallet using this approach requires exploring all the possible accounts and indexes of a derivation path.

If we do not use the address gap limit to interrupt the active keys search, we need to brute force all the possible accounts (31 bits, that is ~2 billion accounts). Each account has 32-bit keys: ~4 billion address indexes, ~2 billion hardened and ~2 billion normal. For each of the 2 billion accounts we therefore have to generate 4 billion addresses and then check which have unspent transactions in the UTXO set.

Taking the "expected keysearch rate" used to search for vanity addresses as a benchmark, we can assume that a modern GPU can process between 15 and 2000 million keys per second (Mkey/s). The time required to generate the 4 billion possible keys for each account is therefore between 2 seconds and 5 minutes (number of keys/GPU processing power).

For each key we then verify if it has unspent transactions in the UTXO set, assuming that the UTXO set is stored in RAM and thus is very quick to test, we estimate that the entire process of key generation and UTXO checking requires between 5 seconds and 5 minutes, depending on the GPU used. As we must explore all the possible indexes, the time to complete this process is constant, no matter whether we are searching for 1 or 1000 active addresses, unless we know the number of active addresses (in this case we can perform an early stop when that number has been reached).

As we have assumed, we do not know any information regarding the account, we must explore also all the account space (composed of $2^{31}$ bits). Therefore, we must repeat the brute force process for the ~2 billion possible accounts. With the fastest GPU (5 seconds to brute force ~4 billion address indexes), we need 5 seconds per account, so exploring ~2 billion accounts would require around ~340 years.

If we parallelize the process, for example by running 100 GPUs in parallel, the time could drop down to 3.4 years. Note that one such GPU can cost between £2000-£3000 excluding the price of electricity for 3 years, so it is a big investment to recover one wallet and probably not feasible for most of the users.

If we reintroduce the gap limit of 20 inactive addresses, the brute force process would be much quicker than 5 seconds and we can safely assume that it would take less than 1 millisecond per account. If we want to test this for all the accounts, we need 1 millisecond x 2 billion possible accounts, giving a total of ~25 days.

If a gap limit is introduced also in the account generation, then we would probably just need to check some hundreds of accounts instead of all the 2 billion possible accounts. In this case the entire process can be completed in 1 second or so. Note that this would be true even for higher gap limits (e.g., 100).

Key Bruteforcing Examples

We now compare the time required to bruteforce the keys in a HD wallet, using two widely used GPUs. In the first experiment we considered a high-level GPU, a GeForce RTX 2080 SUPER (2000 Mkey/s), while in the second we considered a medium-level GeForce GTX 780 Ti (50 Mkey/s). Note that the 'Size' column refers to the total number of key index bits in the derivation path that have been randomly generated (e.g., 1 depth in the derivation path is 32 bits, 2 depths is 64 bits etc.). The results of the investigation are shown in Table 2.

TABLE 2

Time taken to brute force the keys in a HD wallet using two different GPUs.

| | | Time Taken | |
|---|---|---|---|
| Size | Number of Keys | GPU 1: 2000 Mkey/s | GPU 2: 50 Mkey/s |
| 32 bits | 4,294,967,296 | 2.1 seconds | 85 seconds |
| 40 bits | 1,099,511,627,776 | 9 minutes | 6 hours |
| 48 bits | 281,474,976,710,656 | 39 hours | 65 days |
| 56 bits | 72,057,594,037,927,936 | 416 days | 45 years |
| 64 bits | 18,446,744,073,709,551,616 | 292 years | 11,698 years |

The computation shows that a single 32-bit key index can easily be brute forced using either type of GPU (2 or 85 seconds in our examples above). Note that this is independent of the index chosen, i.e., the address index or the account.

However, it is more complex when two indexes (e.g., both the address index and the account) are generated randomly. In fact, the address index (32 bits) plus account (32 bits) gives a total size of 64 bits, which is computationally too expensive to bruteforce even when using a top-level GPU. This would require 292 years just to generate all the keys, excluding the time to check which public keys have valid unspent transactions.

A hybrid solution could be to randomly create only a sub-space of some of the indexes. For example, the account index could be limited to 8 or 16-bits with the remaining bits generated deterministically or simply set to zero. In general, we can compute a hybrid key index as $$\text{index}_{hybrid} = \text{hash}(m) \bmod 2^{16} \quad (7)$$

for normal keys, prepending with zeros to create a 32-bit integer, and $$\text{index}'_{hybrid} = (\text{hash}(m) \bmod 2^{16}) + 2^{31} \quad (8)$$

for hardened keys.

TABLE 3

Time taken to brute force randomly generated key indexes in a HD wallet using two different GPUs.

| | | Time Taken | |
|---|---|---|---|
| Size | Random Key Index | GPU 1: 2000 Mkey/s | GPU 2: 50 Mkey/s |
| 32 bits | Address Index | 2.1 seconds | 85 seconds |
| 32 bits | Account | 2.1 seconds | 85 seconds |
| 31 bits | Account (hardened keys only) | 1 second | 43 seconds |
| 8 + 32 bits | Account + Address Index | 9 minutes | 6 hours |
| 16 + 32 bits | Account + Address Index | 39 hours | 65 days |

Table 3 summarizes the times required to brute force a random address index, account, and a hybrid solution. The results reveal a trade-off between the time to bruteforce keys derived from random indexes and the possibility for a hash collision, which is increased when using a smaller bit space for the random component of a hybrid index. For users wishing to embed external data into multiple derivation depths (e.g. at the address and account level), we recommend opting for a hybrid solution for any additional random key indexes. For example, a 32-bit randomly generated address index could be used in conjunction with an 8- or 16-bit hybrid random account index. These key indexes could be provided together for example during any auditing process. However, if the indexes need to be considered separately, for instance during identity verification, then it is advisable to use a larger 16-bit hybrid random index to minimise the chances of a hash collision.

Message Bruteforcing

An alternative to account/index bruteforcing is to bruteforce the message m instead of the entire account, i.e. the index space. Message bruteforcing consists in generating all the possible messages, such as the invoices or any other information used to generate the keys, instead of the keys themselves. This approach is more efficient than the exhaustive key search when the message space is smaller than the account/index space, because the possible keys generated from a small message space is a subset of the total of possible keys. For example, if we know that an invoice message is represented as a string with a constant part and some variables, like the following:

m='Sold bicycle for 3 BSV with frame number XXXX and date YY/YY/YYYY' instead of bruteforcing ~4 billion address indexes we could bruteforce the variable parts of the message, XXXX and YY/YY/YYYY.

Assuming we want to mine invoices for the last 10 years then there are 3650 different values for the variable YY/YY/YYYY (365 days×10 years). Also, assuming a maximum of 1,000,000 invoices per year generated with some logic, we have 1,000,000 different values for the variable XXXX. The space to be explored is therefore 1,000,000×3650=~3.6 billion combinations, which is the same order of magnitude as brute forcing the address indexes. In this case, bruteforcing indexes or messages has a similar complexity, and thus requires a similar amount of time.

Mining invoices can be convenient if we can reduce the space to be explored. For example, if we have a maximum of 1,000 possible invoices and we consider only 1 year, we have 1,000×365=365,000 combinations that can be brute forced in around 0.2 milliseconds (instead of 5 seconds). Brute forcing all the accounts would require around 5 days to be completed (instead of 340 years). Note that having an expensive GPU running full time for 5 days only to brute force a single HD wallet would still not be a cost-effective option, so the account management should be solved using a deterministic approach.

Hash Collisions

We now evaluate the probability that two messages m (the external data) generate the same 32-bit index and therefore map to the same child key in the EDHD wallet. This problem is a generalization of the Birthday paradox so we can use the following (approximated) formula to compute the probability that at least two key indexes are the same, given n messages with a range [1, d]:

$$p = 1 - \left(\frac{d-1}{d}\right)^{\frac{n(n-1)}{2}} \quad (9)$$

Therefore, the collision probability in a range $d=2^{32}$ is:

$$p = 1 - \left(\frac{2^{32}-1}{2^{32}}\right)^{\frac{n(n-1)}{2}} \quad (10)$$

Some examples are given in Table 4, for example, 10,000 messages are inserted with a collision probability of 1.1%, while 100,000 messages are inserted with a collision probability of around 68.8% (this means that, on average, only 31.2% of the messages will have a unique derivation path). If we want to avoid collisions, a collision probability lower than $10^{-6}$ is generally considered acceptable and thus reasonable for a wallet implementation, which means that no more than 100 keys per account should be generated using messages m (e.g. invoices). To increase the number of keys per account, a collision management tool could be implemented. As an example, a message m could be slightly modified (e.g. incrementing a counter) if it generates an index already in use.

Alternatively, collisions can be accepted. This would not result in the loss of any funds, as the only effect is that an address will be reused (this may result in a very minor loss of privacy). To uniquely link an invoice to a transaction, asides from the public key, other factors could also be used, such as the invoice amount and time. The estimated number of collisions, inserting n keys can be computed as follows:

$$\text{repetitions} = n - d + d\left(\frac{d-1}{d}\right)^n \quad (11)$$

As shown in the final column of Table 4, we expect some collisions as the number of messages increases: for example, we expect 0.29 repetitions when 50,000 messages are used, the expected number of repetitions raises to 1.16 when 100,000 messages are used. This means that when we generate keys starting from 100,000 different messages, on average, two of those messages will share the same public key (i.e., two invoices share the same address).

TABLE 4

Hash collision probabilities and number of expected collisions.

| Number of messages (n) | Collision probability | Collision counting |
|---|---|---|
| 10 | 1.06e−8 | 1.06e−8 |
| 100 | 1.16e−6 | 1.16e−6 |
| 1000 | 1.16e−4 | 1.16e−4 |
| 10,000 | 1.16e−2 | 1.16e−2 |
| 50,000 | 2.52e−1 | 0.29 |
| 100,000 | 6.88e−1 | 1.16 |
| 500,000 | 1 − 2.29e−13 | 29.1 |
| 1,000,000 | 1 − 2.76e−51 | 116.4 |

Benford's Wallet

A wallet design known as Benford's wallet provides a mechanism that protects the privacy of both merchant and user transacting over a public blockchain whilst ensuring regulatory compliance. In short, invoice data is used in the derivation of output addresses, which is useful for auditing. At the same time, the value of the invoice is obfuscated by distributing it across these multiple output addresses in multiple transactions, which promotes on-chain privacy.

The protocol uses a chain code or a shared secret interchangeably to link an invoice message m across the different output addresses. Both methods modify the generalised BIP32 CKD function shown in (3) by introducing an additional step after Equations (1) or (2) in order to derive normal or hardened private keys from the hash of m as $$sk_i = sk_{par} + \text{HMAC256}(\text{HMAC512}_L(\blacksquare), m) \bmod n. \quad (12)$$

Both methods reintroduce the bag of keys problem because the external data is included by adding an extra step to the child key derivation path. The method described for an EDHD wallet above resolves this issue because it works within the existing BIP32 framework without introducing any extra steps that could lead to the bag of keys scenario.

We can combine Benford's wallet with the EDHD wallet to get the benefits of both. For example, invoices can be embedded in a HD wallet according to the index mapping described above, while obfuscating the value of the invoice by splitting the transaction across different output addresses according to Benford's Law.

Since Benford's wallet takes one invoice and from it produces several output addresses, we need to take some care to adjust this to the EDHD wallet scheme, which, as previously presented, maps one invoice to one output address. There are a few options to do this:

1. Add a counter—a new invoice message is generated for each output address by concatenating with an integer n at the start of the invoice message m such that $m_{Benford} = n \| \text{invoice}$. The counter is increased incrementally to the total number of output addresses attributed to a single invoice. For example, if n=3, the key derivation entity 701 generates three indices and corresponding keys using:

$$\text{index}_i = \text{hash}(m_{Benford,i}) \bmod 2^{31}$$

where $$m_{Benford,0} = 0 \| \text{invoice}$$

$$m_{Benford,1} = 1 \| \text{invoice}$$

$$m_{Benford,2} = 2 \| \text{invoice}$$

2. Split the invoice—the message is split into n equal chunks of data across n different output addresses.
3. Have two depths in the derivation path—the value of the outputs for a single invoice can be split over two depths of the derivation path. For example, the invoice message ($m_{Benford}$=invoice) can be used to derive the parent key and the remaining output addresses are then the first n−1 child keys. This method means that we also do not incur a penalty in the wallet recovery time when embedding external data over different depths of the derivation paths.

These techniques would require knowledge of the n partitions of the invoice value as described in. The random partitioning denoted by n could be derived deterministically from the invoice message itself, in the same way that the key index is derived in Equation (4) but modifying the modulo to a realistic upper limit for the number of partitions of an invoice (e.g. ten partitions). This provides a description of a Benford-EDHD wallet.

Random Partitioning to Achieve Benford's Law

In order for Bob (i.e. key derivation entity 701) to randomly split an invoice of 3 BSV over many outputs and many transactions there are two tasks to do:
1. Randomly choose the number of outputs and the number of transactions to use.
2. Randomly split the invoice value in BSV over the selected number of outputs.

We will achieve these goals in two steps using two different random partition methods. The first step involves partitioning small integers and taking a uniform random selection of this set. The second step uses uniform random slices of a large number (the invoice value in satoshis) in order to create a set of partitions that add up to the large number. In randomisation involved in both steps results in Benford's Law applied to transaction number, number of transactions per output, and the output values themselves.

In what follows we only require that one parameter N needs to be chosen by the user Bob in advance. This is defined to be N=Maximum number of outputs. We anticipate that in real-world scenarios this number will be small, for example less than 20.

I. Transaction and output distribution. A user Bob defines an integer N, as above, which represents the maximum number of outputs he is willing to split an invoice over. We are going to describe a process that outputs m transaction templates with a total of n outputs, where n≤N.

Step 1: Identify or look up the integer partitions of each integer k satisfying 1≤k≤N. An integer partition is a distinct combination of (unordered) numbers that sum to give n. For example, the integer partitions of k=3 and k=4 are:

| 3,        | 4,        |
|-----------|-----------|
| 2 + 1,    | 3 + 1,    |
| 1 + 1 + 1,| 2 + 2,    |
| 2 + 1 + 1,|           |
| 1 + 1 + 1 + 1 |       |

We see that there are 3 possible integer partitions of 3, and 5 possible integer partitions of 4. The number of integer partitions does not scale linearly. The following table tells us the number of partitions for each integer k≤50.

| k | Number of Partitions |
|---|---|
| 1 | 1 |
| 2 | 2 |
| 3 | 3 |
| 4 | 5 |
| 5 | 7 |
| 6 | 11 |
| 7 | 15 |
| 8 | 22 |
| 9 | 30 |
| 10 | 42 |
| 11 | 56 |
| 12 | 77 |
| 13 | 101 |
| 14 | 135 |
| 15 | 176 |
| 16 | 231 |
| 17 | 297 |
| 18 | 385 |
| 19 | 490 |
| 20 | 627 |
| 21 | 792 |
| 22 | 1002 |
| 23 | 1255 |
| 24 | 1575 |
| 25 | 1958 |
| 26 | 2436 |
| 27 | 3010 |
| 28 | 3718 |
| 29 | 4565 |
| 30 | 5604 |
| 31 | 6842 |
| 32 | 8349 |
| 33 | 10143 |
| 34 | 12310 |
| 35 | 14883 |
| 36 | 17977 |
| 37 | 21637 |
| 38 | 26015 |
| 39 | 31185 |
| 40 | 37338 |
| 41 | 44583 |
| 42 | 53174 |
| 43 | 63261 |
| 44 | 75175 |
| 45 | 89134 |
| 46 | 105558 |
| 47 | 124754 |
| 48 | 147273 |
| 49 | 173525 |
| 50 | 204226 |

Figure 9:
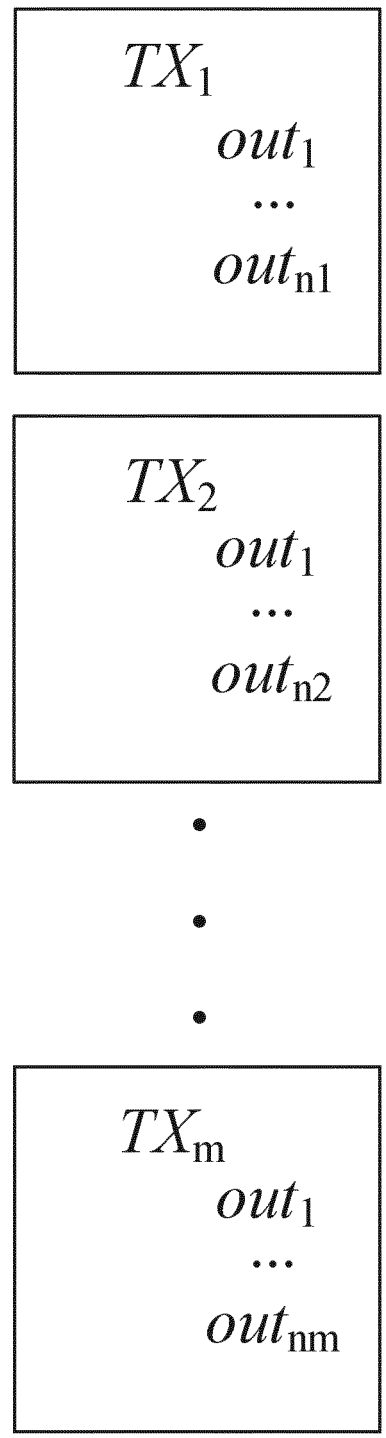

Step 2: Pick a single partition uniformly randomly from all possible partitions of each k satisfying 1≤k≤N. We can write this partition as $n_1 + \ldots + n_m = n$ for some integers m, n where 1≤m≤n≤N. We interpret each term as defining a transaction with $n_i$ outputs. That is, m transactions will be constructed, and transaction i will have $n_i$ outputs for 1≤i≤m. FIG. 9 shows this schematically. The total number of outputs is n.

These 2 steps complete the initial setup for our value partition process in the next section. In addition to the required single integer input N, we suggest a few optional inputs user Bob can provide:
1. Minimum number of transactions or outputs: this can be used to avoid trivial cases.
2. Maximum number of transactions: this can be used to put a cap on the overhead from the transaction fees or the amount of data transmitted between senders and receivers. In some cases, the number of transactions defines the minimal number of inputs required from the sender, which can be capped by this optional parameter.

II. Invoice value distribution. Given an invoice value of L BSV and the list of m transaction templates obtained in the previous process, the following procedure may be used to fill in the n outputs:
1. Uniformly randomly generate n−1 numbers with $10^{-8}$ precision (as the minimal unit is 1 satoshi, $10^{-8}$ BSV), $U_1, U_2, \ldots, U_{n-1} \in (0,1)$.

2. Sort U, in an ascending order, $0<U_{(1)}<U_{(2)}< \ldots <U_{(n-1)}<1$.
3. Compute the partition as $X_i=U_{(i)}-U_{(i-1)}$ for $i=1, 2, \ldots, n$, where $U_{(0)}=0$ and $U_{(n)}=1$.

Now we have the invoice value L, proportionally partitioned as $X_i$'s to form n values, and m transaction templates with a total number of n outputs, one for each of the n values. The partition $X_i$'s follows Benford's Law in its general interpretation. That is, the smaller the leading digit of $X_i$, the more likely it appears. The scaling factor L does not affect the distribution of the leading digit. We provide the detailed proof with L=1, and extend the result to any value of L>0.

Linking to Identity Certificates

Digital certificates are signed and issued by a CA, who acts as a trusted third party 702 in verifying the link between a user's identity and the subject public key specified in the certificate. Requesting certification from commercial CAs can become rather costly should a user wish to certify several keys. Yet cryptographic best practices for digital key management recommend avoiding the re-use of public keys. It would therefore be far more efficient and cost-effective for users transacting over the blockchain network to adopt deterministic methods when linking their identity data to an entire wallet of keys.

Certifying Parent Keys

The most straightforward method to link identity data to a set of keys in a HD wallet would be to certify the master public key or the account keys derived from the master key such that there is a link to the identity certificate of each respective account holder. A provable link to the identity of the wallet, i.e. account owner can be established for addresses that are generated from normal (i.e. not hardened) child keys. We can thus carry out identity audits on the address keys, which are normal children, since they can be provably linked to the parent for which an identity certificate has been issued.

We can also verify that a child key has been used after its parent key was certified (i.e. the digital certificate existed beforehand) as follows:
1. Timestamps—Digital certificates usually contain a timestamp. The timestamp could be used as evidence that the certificate was created before the child keys were used on chain.
2. Digital certificates on-chain—If the certificate itself is issued on-chain, or a hash commit was registered on-chain, this also provides evidence that the certificate existed in time before the child keys (or at least before the child keys were used on-chain, which is functionally equivalent)

Note a distinction here from the comparatively less stringent case of auditing invoices, where evidence of a link to the external data is sufficient. For identity audits, we would seek a cryptographic proof to correctly verify a user's identity with respect to the child keys in a HD wallet. By providing an identity certificate for a parent key, and deriving child keys with indexes based on invoices then we have a system that is very audit friendly Mapping Digital Certificates to Key Indexes An alternative way to link user identities to keys in a HD wallet is to map a digital certificate to the key index, using the method described above. This can be achieved by simply setting the external data in Equation 4 to m=digital certificate. However, it should be emphasised that using this method would not provide a cryptographic proof to a user's identity for the same reasons provided above.

Additional protocols must therefore be put in place to check that a wallet owner knows the private key of the subject public key specified in the digital certificate. Such protocols might make use of various attestation methods based on digital signatures, knowledge of hash preimages (where relevant) or zero knowledge proofs, for users to cryptographically prove ownership of a certified private-public keypair.

Figure 10:
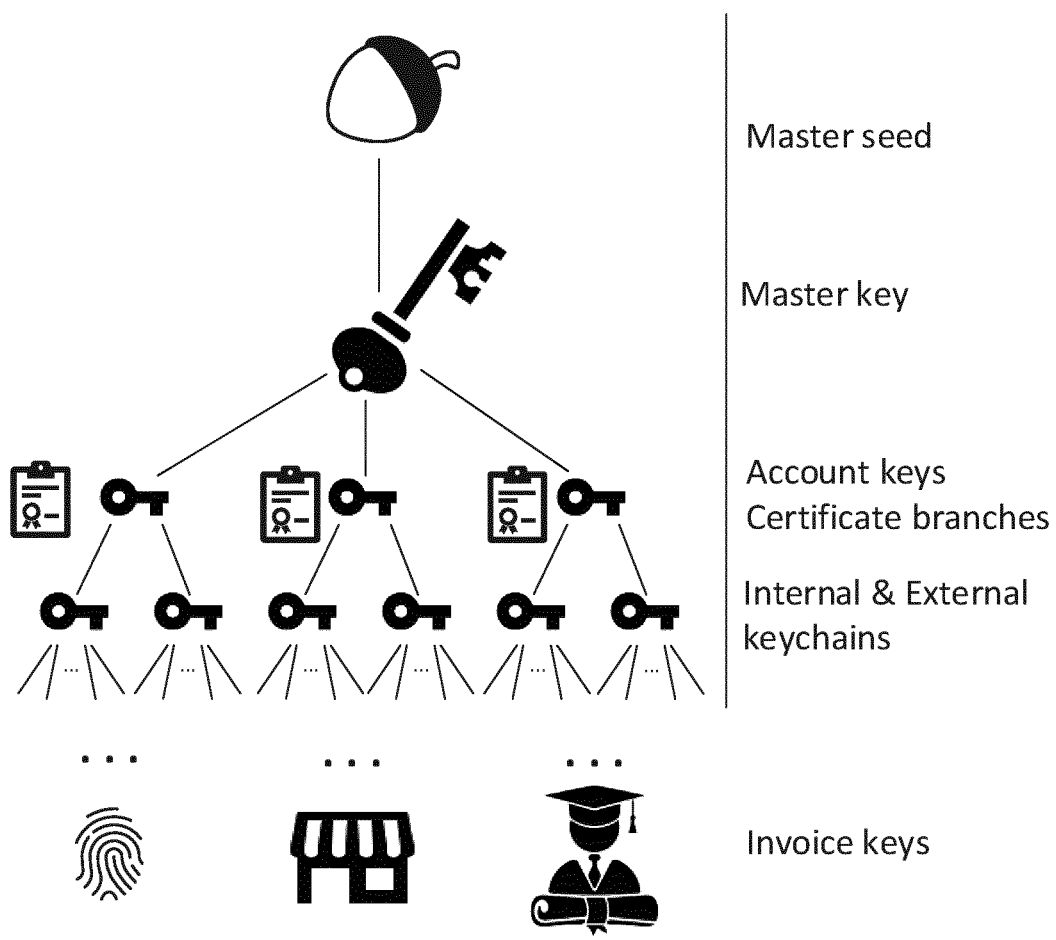

Mapping identity data to the account level allows partitioning of entire branches of keys according to different digital certificates. FIG. 10 illustrates how different digital certificates could be used to structure an EDHD wallet according to an 'Identity' branch, a 'Merchant' branch and an 'Education' branch. The key indexes at the account level are now random since they are calculated from the hash of the respective digital certificates. Recall that the random index resulting from the hash of some external data at the account level should be confined to a smaller bit space, based on the discussion above for wallet recovery.

The full derivation path for a BIP44 bitcoin EDHD wallet could be written as:

m/44'/0'/(hybrid_random_account')/0/(random_address_index)

where the hybrid_random_account' key index is generated using Equation 8 when m=digital certificate and the random_address_index is generated using Equation 5 when m=invoice message. We can develop the structure of each branch even further to suit different business applications. If we consider the 'Merchant' branch, a merchant can assign the child keys at depth 4 to correspond to refunds where the hash preimage (i.e., the original invoice) is required to create the child key at depth 3 such that the refund could be authorised by transferring the UTXO amount from the invoice key to a child key at depth 4 that is generated specifically to issue refunds.

The method of mapping digital certificates to key indexes could also be extended to create links between different identities. For example, one could incorporate someone else's identity certificate into their own wallet e.g., a payee's identity certificate and invoice could be mapped to an output address used by a merchant's wallet. The certificate and invoice could be combined as follows:

$$\text{index}=\text{hash}(\text{digital certificate}\|\text{invoice})\bmod 2^{32} \qquad (13)$$

Now we have a means of linking the identity of a user (the buyer) to a sale (the invoice) all within the merchant's wallet software. This is particularly useful for high value transactions e.g., the sale of a car or house.

CONCLUSION

Other variants or use cases of the disclosed techniques may become apparent to the person skilled in the art once given the disclosure herein. The scope of the disclosure is not limited by the described embodiments but only by the accompanying claims.

For instance, some embodiments above have been described in terms of a bitcoin network 106, bitcoin blockchain 150 and bitcoin nodes 104. However it will be appreciated that the bitcoin blockchain is one particular example of a blockchain 150 and the above description may apply generally to any blockchain. That is, the present invention is in by no way limited to the bitcoin blockchain. More generally, any reference above to bitcoin network 106, bitcoin blockchain 150 and bitcoin nodes 104 may be replaced with reference to a blockchain network 106, blockchain 150 and blockchain node 104 respectively. The blockchain, blockchain network and/or blockchain nodes may share some or all of the described properties of the bitcoin blockchain 150, bitcoin network 106 and bitcoin nodes 104 as described above.

In preferred embodiments of the invention, the blockchain network 106 is the bitcoin network and bitcoin nodes 104 perform at least all of the described functions of creating, publishing, propagating and storing blocks 151 of the blockchain 150. It is not excluded that there may be other network entities (or network elements) that only perform one or some but not all of these functions. That is, a network entity may perform the function of propagating and/or storing blocks without creating and publishing blocks (recall that these entities are not considered nodes of the preferred bitcoin network 106).

In other embodiments of the invention, the blockchain network 106 may not be the bitcoin network. In these embodiments, it is not excluded that a node may perform at least one or some but not all of the functions of creating, publishing, propagating and storing blocks 151 of the blockchain 150. For instance, on those other blockchain networks a "node" may be used to refer to a network entity that is configured to create and publish blocks 151 but not store and/or propagate those blocks 151 to other nodes.

Even more generally, any reference to the term "bitcoin node" 104 above may be replaced with the term "network entity" or "network element", wherein such an entity/element is configured to perform some or all of the roles of creating, publishing, propagating and storing blocks. The functions of such a network entity/element may be implemented in hardware in the same way described above with reference to a blockchain node 104.

It will be appreciated that the above embodiments have been described by way of example only. More generally there may be provided a method, apparatus or program in accordance with any one or more of the following Statements.

Statement 1. A computer-implemented method of deriving keys of a hierarchical key structure, wherein the key structure comprising a hierarchy of levels, the hierarchy of levels comprising a master level and one or more child levels, wherein the master level comprises a master key, and wherein each child level comprises one or more child keys, each respective child key of a given level being linked to one key of a preceding level, wherein that one key of the preceding level is a respective parent key of the respective child key, and wherein the method is performed by a first party and comprises:
    generating a target index of a target child key, wherein the target index is generated based on a first result of inputting at least a target message to a first hash function; and deriving the target child key of a level in the hierarchy based on a) a parent key of a preceding level in the hierarchy, and b) a second result of inputting at least i) the parent key, and ii) the target index, to a second hash function.

Statement 2. The method of statement 1, wherein the target child key is based on a first part of the second result.

Statement 3. The method of statement 2, comprising generating a target chain code of the target child key, wherein the target chain code is based on a second part of the second result.

Statement 4. The method of any preceding statement, wherein the target child key is derived by inputting iii) a respective chain code of the parent key, to the second hash function.

Statement 5. The method of any preceding statement, wherein the second hash function is a hash-based message authentication code, HMAC, function.

Statement 6. The method of any preceding statement, wherein the parent key is a private key, and wherein the target child key is a private key.

Statement 7. The method of statement 6, wherein the parent key input to the second hash function is a public key corresponding to the parent key.

Statement The method of statement 6 or statement 7, comprising generating a target public key corresponding to the target child key.

Statement 9. The method of any of statements 1 to 5, wherein the parent key is a public key, wherein the target child key is a public key, and wherein the target child key is derived based on a public key corresponding to the second result.

Statement 10. The method of any preceding statement, comprising any one or more of:
    generating a blockchain transaction comprising an output locked to the target child key, and sending the blockchain transaction to the blockchain network and/or a second party;
    calculating a target blockchain address based on the target child key, and sending the target blockchain address to the second party; and/or
    sending the target child key to the second party for generating the target blockchain address.

Statement 11. The method of statement 10, wherein the blockchain comprises a blockchain transaction comprising an output sent to the target blockchain address, and wherein the method comprises:
    deriving a sequence of candidate child keys and corresponding candidate blockchain addresses, wherein each candidate child key is derived based on the parent key, and b) a second result of inputting at least i) the parent key, and ii) a respective candidate index, to a second hash function, wherein the respective candidate index is a respective value of a sequence of possible values that the index may take and differs for each candidate child key;
    identifying a blockchain transaction comprising an output sent to at least one of the candidate blockchain addresses; and
    based on said identification, determining that the target child key is the candidate child key having the corresponding candidate blockchain address to which the output of the identified blockchain transaction is locked.

Statement 12. The method of statement 10, wherein the blockchain comprises a blockchain transaction comprising an output sent to the target blockchain address, and wherein the method comprises using the target blockchain address to identify the blockchain transaction.

Statement 13. The method of any preceding statement, wherein the target child key is a public key and wherein the method comprises using the target child key to encrypt a message, or wherein the target child key is a private key and wherein the method comprises using the target child key to decrypt a message that has been encrypted with a corresponding public key.

The encrypted message may be sent to or received from a different party.

Statement 14. The method of any preceding statement, comprising proving a link between the target child key and the message by providing at least the parent key, and the target message to a third party.

The chain code of the parent key may also be provided in the case that the target child key is generated based on said chain code.

Statement 15. The method of any preceding statement, wherein the target message comprises a digital certificate issued by a certificate authority.

Statement 16. The method of any preceding statement, wherein the master key is a certified public key that has been certified with a digital certificate issued by a certificate authority.

Statement 17. The method of statement 15 and statement 16, wherein the target message comprises the digital certificate certifying the certified public key.

Statement 18. The method of statement 15, wherein the digital certificate certifies a public key owned by a third party.

For instance, the third party may be a customer that generates a blockchain transaction comprising an output locked to the child key derived based on the target message.

Statement 19. The method of any preceding statement, comprising deriving one or more additional child keys, wherein generating each respective additional child key comprises:
  generating a respective index of the respective child key, wherein the respective index is generated based on a respective first result of inputting at least a respective message to the first hash function; and
  deriving the respective child key of a level in the hierarchy based on a) a respective parent key of a preceding level in the hierarchy, and b) a respective second result of inputting at least i) the respective parent key, and ii) the respective index, to the second hash function.

Statement 20. The method of statement 18, wherein some or all of the additional child keys are derived based on the same parent key as the target child key.

Statement 21. The method of statement 18 or statement 19, wherein some or all of the additional child keys are derived based on a different parent key compared to the target child key.

Statement 22. The method of statement 20, wherein the target child key is the parent key for one or more of the additional child keys.

Statement 23. The method of statement 18 or statement 19, wherein some or all of the additional child keys are in the same level of the hierarchy as the target child key.

Statement 24. The method of statement 19, wherein the respective index used to derive the target child key and each of one or more of the additional child keys is derived based on a respective first result of inputting at least the message and a respective counter value, to the first hash function.

Statement 25. The method of statement 19, comprising:
  splitting an overall message into a plurality of components, wherein the respective index used to derive the target child key and each of one or more of the additional child keys is derived based on a respective first result of inputting at least a different component of the overall message to the first hash function.

Statement 26. The method of any of statements 1 to 17, comprising deriving one or more additional child keys, wherein deriving each respective additional child key comprises:
  deriving the respective child key based on a) the target child key, and b) a respective second result of inputting at least i) the target child key, and ii) a respective index, to the second hash function, wherein the respective index is a respective value of a sequence.

Statement 27. The method of any of statements 18 to 26, comprising:
  generating a respective blockchain address corresponding to each generated child key; and
  sending the respective blockchain addresses to a different party.

Statement 28. The method of any of statements 18 to 27, comprising:
  generating one or more blockchain transactions, each comprising one or more outputs, wherein each output is locked to a respective one of the generated child keys; and sending the one or more blockchain transaction to the blockchain network, and/or sending the one or more blockchain transactions to the different party.

Statement 29. The method of any preceding statement, wherein said deriving of the target child key comprises recovering the target child key, and wherein said recovering of the target child key comprises:
  generating the master key based on a corresponding seed; and
  deriving the parent key of the target child key based on the master key.

The parent key may be derived directly from the master key, i.e. the parent key of the target child key is itself a child key of the master key. Alternatively, the parent key may be indirectly derived from the master key by deriving one or more keys belonging to different respective levels of the key structure.

Statement 30. Computer equipment comprising:
  memory comprising one or more memory units; and
  processing apparatus comprising one or more processing units, wherein the memory stores code arranged to run on the processing apparatus, the code being configured so as when on the processing apparatus to perform the method of any preceding statement.

Statement 31. A computer program embodied on computer-readable storage and configured so as, when run on one or more processors, to perform the method of any preceding statement.

The invention claimed is:

1. A computer-implemented method of deriving keys of a hierarchical key structure, wherein the key structure comprising a hierarchy of levels, the hierarchy of levels comprising a master level and one or more child levels, wherein the master level comprises a master key, and wherein each child level comprises one or more child keys, each respective child key of a given level being linked to one key of a preceding level, wherein that one key of the preceding level is a respective parent key of the respective child key, and wherein the method is performed by a first party and comprises:
  generating a target index of a target child key, wherein the target index is generated based on a first result of inputting at least a target message to a first hash function; and
  deriving the target child key of a level in the hierarchy based on a) a parent key of a preceding level in the hierarchy, and b) a second result of inputting at least i) the parent key, and ii) the target index, to a second hash function.

2. The method of claim 1, wherein the target child key is based on a first part of the second result.

3. The method of claim 2, comprising generating a target chain code of the target child key, wherein the target chain code is based on a second part of the second result.

4. The method of claim 1, wherein the target child key is derived by inputting iii) a respective chain code of the parent key, to the second hash function.

5. The method of claim 1, wherein the second hash function is a HMAC function.

6. The method of claim 1, wherein the parent key is a private key, and wherein the target child key is a private key.

7. The method of claim 6, wherein the parent key input to the second hash function is a public key corresponding to the parent key.

8. The method of claim 1, comprising any one or more of:
generating a blockchain transaction comprising an output locked to the target child key, and sending the blockchain transaction to a blockchain network and/or a second party;
calculating a target blockchain address based on the target child key, and sending the target blockchain address to the second party; and/or
sending the target child key to the second party for generating the target blockchain address.

9. The method of claim 8, wherein the blockchain comprises a blockchain transaction comprising an output sent to the target blockchain address, and wherein the method comprises:
deriving a sequence of candidate child keys and corresponding candidate blockchain addresses, wherein each candidate child key is derived based on the parent key, and b) a second result of inputting at least i) the parent key, and ii) a respective candidate index, to a second hash function, wherein the respective candidate index is a respective value of a sequence of possible values that the index may take and differs for each candidate child key;
identifying an identification of a blockchain transaction comprising an output sent to at least one of the candidate blockchain addresses; and
based on said identification, determining that the target child key is the candidate child key having the corresponding candidate blockchain address to which the output of the identified blockchain transaction is locked.

10. The method of claim 8, wherein the blockchain comprises a blockchain transaction comprising an output sent to the target blockchain address, and wherein the method comprises using the target blockchain address to identify the blockchain transaction.

11. The method of claim 1, wherein the target child key is a public key and wherein the method comprises using the target child key to encrypt a message, or wherein the target child key is a private key and wherein the method comprises using the target child key to decrypt a message that has been encrypted with a corresponding public key.

12. The method of claim 1, comprising proving a link between the target child key and the message by providing at least the parent key, and the target message to a third party.

13. The method of claim 1, wherein the target message comprises a digital certificate issued by a certificate authority.

14. The method of claim 1, wherein the master key is a certified public key that has been certified with a digital certificate issued by a certificate authority.

15. The method of claim 13, wherein the master key is a certified public key that has been certified with a digital certificate issued by a certificate authority, and wherein the target message comprises the digital certificate certifying the certified public key.

16. The method of claim 13, wherein the digital certificate certifies a public key owned by a third party.

17. The method of claim 1, comprising deriving one or more additional child keys, wherein generating each respective additional child key comprises:
generating a respective index of the respective child key, wherein the respective index is generated based on a respective first result of inputting at least a respective message to the first hash function; and
deriving the respective child key of a level in the hierarchy based on a) a respective parent key of a preceding level in the hierarchy, and b) a respective second result of inputting at least i) the respective parent key, and ii) the respective index, to the second hash function.

18. The method of claim 17, comprising:
splitting an overall message into a plurality of components, wherein the respective index used to derive the target child key and each of one or more of the additional child keys is derived based on a respective first result of inputting at least a different component of the overall message to the first hash function.

19. Computer equipment comprising:
memory comprising one or more memory units; and
processing apparatus comprising one or more processing units, wherein the memory stores code arranged to run on the processing apparatus, the code being configured so as when run on the processing apparatus, the processing apparatus performs a method of deriving keys of a hierarchical key structure, wherein the key structure comprising a hierarchy of levels, the hierarchy of levels comprising a master level and one or more child levels, wherein the master level comprises a master key, and wherein each child level comprises one or more child keys, each respective child key of a given level being linked to one key of a preceding level, wherein that one key of the preceding level is a respective parent key of the respective child key, and wherein the method is performed by a first party and comprises:
generating a target index of a target child key, wherein the target index is generated based on a first result of inputting at least a target message to a first hash function; and
deriving the target child key of a level in the hierarchy based on a) a parent key of a preceding level in the hierarchy, and b) a second result of inputting at least i) the parent key, and ii) the target index, to a second hash function.

20. A computer program embodied on a non-transitory computer-readable storage media and configured so as, when run on one or more processors, the one or more processors perform a method of deriving keys of a hierarchical key structure, wherein the key structure comprising a hierarchy of levels, the hierarchy of levels comprising a master level and one or more child levels, wherein the master level comprises a master key, and wherein each child level comprises one or more child keys, each respective child key of a given level being linked to one key of a preceding level, wherein that one key of the preceding level is a respective parent key of the respective child key, and wherein the method is performed by a first party and comprises:
generating a target index of a target child key, wherein the target index is generated based on a first result of inputting at least a target message to a first hash function; and deriving the target child key of a level in the hierarchy based on a) a parent key of a preceding level in the hierarchy, and b) a second result of inputting at least i) the parent key, and ii) the target index, to a second hash function.

\* \* \* \* \*